United States Patent
Sinha et al.

(10) Patent No.: US 12,468,576 B2
(45) Date of Patent: Nov. 11, 2025

(54) SYSTEMS, METHODS AND COMPUTER PROGRAM PRODUCTS FOR JOB MANAGEMENT

(71) Applicant: Spillbox Inc., San Jose, CA (US)

(72) Inventors: Alok Kumar Sinha, San Jose, CA (US); Rajeev Prasad, San Jose, CA (US)

(73) Assignee: Spillbox Inc., San Jose, CA (US)

( * ) Notice: Subject to any disclaimer, the term of this patent is extended or adjusted under 35 U.S.C. 154(b) by 477 days.

(21) Appl. No.: 18/075,717

(22) Filed: Dec. 6, 2022

(65) Prior Publication Data
US 2023/0176908 A1 Jun. 8, 2023

Related U.S. Application Data

(60) Provisional application No. 63/286,217, filed on Dec. 6, 2021.

(51) Int. Cl.
*G06F 9/48* (2006.01)
*G06F 9/50* (2006.01)

(52) U.S. Cl.
CPC ............. *G06F 9/5072* (2013.01); *G06F 9/48* (2013.01); *G06F 9/4806* (2013.01); *G06F 9/4843* (2013.01); *G06F 9/4881* (2013.01); *G06F 9/50* (2013.01); *G06F 9/5005* (2013.01); *G06F 9/5027* (2013.01); *G06F 9/5061* (2013.01); *G06F 9/5077* (2013.01)

(58) Field of Classification Search
CPC ........ G06F 9/48; G06F 9/4806; G06F 9/4843; G06F 9/4881; G06F 9/50; G06F 9/5005; G06F 9/5027; G06F 9/505; G06F 9/5061; G06F 9/5072; G06F 9/5077
See application file for complete search history.

(56) References Cited

U.S. PATENT DOCUMENTS

| | | | | |
|---|---|---|---|---|
| 2006/0167966 | A1* | 7/2006 | Kumar | G06F 9/5083 709/201 |
| 2007/0088828 | A1* | 4/2007 | Inampudi | G06F 9/5072 709/226 |
| 2013/0179894 | A1* | 7/2013 | Calder | G06F 9/5027 718/104 |
| 2013/0318525 | A1* | 11/2013 | Palanisamy | G06F 9/5066 718/1 |

(Continued)

*Primary Examiner* — Charles M Swift
(74) *Attorney, Agent, or Firm* — Schroeder Law PC

(57) ABSTRACT

The invention provides methods, systems and computer program products for job management and for allocating resources for cloud based or remote device based job processing. The invention provides a scalable architecture for job management and for allocating resources for cloud based or remote device based job processing comprising a primary job manager machine, having a resource pool of secondary job manager machines assigned thereto. Each secondary job manager machine has a resource pool of computing machines assigned thereto—for execution jobs or computing tasks assigned to the secondary job manager machine by the primary job manager machine. In an embodiment, each secondary job manager machine has one or more accelerator cache proxies for enabling low latency data object retrieval for computing tasks being executed by the computing machines assigned to the secondary job manager.

17 Claims, 16 Drawing Sheets

(56) References Cited

U.S. PATENT DOCUMENTS

| | | | |
|---|---|---|---|
| 2017/0060621 A1* | 3/2017 | Whipple | G06F 9/5072 |
| 2019/0114262 A1* | 4/2019 | Dimond | G06F 9/4843 |
| 2021/0019187 A1* | 1/2021 | White | G06F 3/0689 |

* cited by examiner

SYSTEMS, METHODS AND COMPUTER PROGRAM PRODUCTS FOR JOB MANAGEMENT

FIELD OF THE INVENTION

The present invention relates to the domain of cloud based or remote device based computing, and more particularly to methods, systems and computer program products for job management and for allocating resources for cloud based or remote device based job processing.

BACKGROUND OF THE INVENTION

For the purpose of the present invention, the terms "computing resource", "machine", "computing machine", "computing device", and/or "data processing device" may be used interchangeably, and shall be understood as referring to a processor based computing device.

Cloud based or network based data centers for providing on-demand computing infrastructure has become widespread. Client application software that were previously executed only on computing devices within the premises of an entity or organization ("On-premise device(s)"), is now capable of being executed on remote servers or remote computing devices located at a remote facility outside the client premises (for example, within a server farm or cloud)—i.e. within a remote computing environment.

When providing on-demand computing within a cloud based or network based remote environment, operations or jobs performed within the remote environment require computing resources (e.g., machines, computing devices, processing cores, memory etc.). The remote computing environment typically implements the allocation of computing resources to pending jobs through a job manager (i.e. a computing device configured to implement functionality of a job manager). A job manager comprises a server or processor implemented entity that is granted access to a resource pool comprising a set of machines, for execution of jobs forwarded to the remote environment for execution. The job manager is configured to queue the received jobs, and distribute each received job (or individual computing tasks associated with a received job) to one or more machines within the resource pool, for execution.

The output from the executed job/computing task(s) is passed back to the job manager by the machine that has been assigned the responsibility for execution of that job/computing task. The job manager transmits the output back to the client device from which a request for remote environment based execution of the job was received. In summary, a job manager is tasked with the responsibility of one or more of (i) receiving jobs for execution within a remote environment, (ii) controlling a set of machines that comprise a resource pool associated with the job manager, (iii) queuing the received jobs for execution by the resource pool, (iv) assigning or distributing queued jobs (or computing tasks associated with such jobs) among the set of machines within the resource pool, and (v) routing the output from completed jobs back to a computing device from which a request for performing the corresponding completed job has been received, or to a target computing device selected as the intended recipient for output of a completed job.

FIG. 1 illustrates a conventional remote computing environment 100 wherein jobs for execution within the remote computing environment are transmitted to the remote computing environment from job execution requesting device(s) 102 via a network 104. The jobs are received at a job manager 106—which has access to and implements performance of received jobs through a job manager resource pool 108. The job manager resource pool 108 comprises a plurality of computing machines for executing received jobs or individual tasks within received jobs—i.e. machine 1 (1082), machine 2 (1084), up to machine n (1086). The job manager 106 may comprise a computing machine that is configured to (i) queue the received jobs, (ii) distribute each received job (or tasks corresponding to the received job(s)) to one or more machines 1082 to 1086 within the job manager resource pool 108 for execution, and (iii) route the output from one or more completed jobs (or computing tasks) back to the job execution requesting device(s) 102.

Execution of jobs in a remote environment via a conventional job manager has been found to suffer from multiple drawbacks. First, as a result of finite processing capacity of the job manager, the job manager itself becomes a bottleneck to execution of jobs. Additionally, when executing a job within a machine in the remote computing environment, the executing machine often requires to retrieve data or data objects from a machine or database that is not located within the remote environment (for example, from a local machine or on-premise machine at which the request for remote environment based execution of a job has originated). Retrieving data or data objects from such devices prior to executing the job within the remote environment further adds to the processing overheads and latency associated with remote execution of jobs within a remote environment.

There is accordingly a need for a readily scalable system that enables execution of jobs within a remote environment while eliminating the bottlenecks associated with job managers of the type illustrated in FIG. 1. There is also a need to enable machines within the remote environment that have been tasked with execution of one or more jobs, to access data or data objects required for execution of such job(s), in a manner that eliminates or reduces processing overheads and latency.

SUMMARY

The invention relates to the domain of cloud based or remote device based computing, and more particularly to methods, systems and computer program products for job management and for allocating resources for cloud based or remote device based job processing.

The invention provides a method for implementing job execution within a network based remote computing environment. The method comprises (i) receiving at a secondary job manager machine from a primary job manager machine, a secondary job execution request identifying a job for execution within the remote computing environment, wherein receiving the secondary job execution request at the secondary job manager machine is preceded by the primary job manager machine (a) receiving a primary job execution request from a job execution requesting device, wherein the primary job execution request comprises a request for execution of the identified job within the remote computing environment, (b) selecting the secondary job manager machine from among a plurality of secondary job manager machines assigned to the primary job manager machine, and (c) transmitting the secondary job execution request to the secondary job manager machine, wherein the transmitted secondary job execution request is generated based on the primary job execution request, (ii) selecting from among a plurality of computing machines assigned to the secondary job manager machine, at least one computing machine for execution of one or more computing tasks corresponding to the job specified in the secondary job execution request, (iii) transmitting to the selected at least one computing machine, one or more data messages comprising instruction(s) for implementing execution of the one or more computing tasks, (iv) receiving at the secondary job manager machine, output data comprising execution output of the one or more computing tasks, wherein said output data is generated and transmitted by the at least one computing machine, and (v) transmitting the received output data to a target recipient device (e.g. the job execution requesting device, or a specified intended recipient device).

The invention additionally provides a system for implementing job execution within a network based remote computing environment. The system comprises a processor implemented secondary job manager machine configured to (i) receive from a primary job manager machine, a secondary job execution request identifying a job for execution within the remote computing environment, wherein receiving the secondary job execution request at the secondary job manager machine is preceded by the primary job manager machine (a) receiving a primary job execution request from a job execution requesting device, wherein the primary job execution request comprises a request for execution of the identified job within the remote computing environment, (b) selecting the secondary job manager machine from among a plurality of secondary job manager machines assigned to the primary job manager machine, and (c) transmitting the secondary job execution request to the secondary job manager machine, wherein the transmitted secondary job execution request is generated based on the primary job execution request, (ii) select from among a plurality of computing machines assigned to the secondary job manager machine, at least one computing machine for execution of one or more computing tasks corresponding to the job specified in the secondary job execution request, (iii) transmit to the selected at least one computing machine, one or more data messages comprising instruction(s) for implementing execution of the one or more computing tasks, (iv) receive at the secondary job manager machine, output data comprising execution output of the one or more computing tasks, wherein said output data is generated and transmitted by the at least one computing machine, and (v) transmit the received output data to a target recipient device (e.g. the job execution requesting device, or a specified intended recipient device).

The invention further provides a computer program product for implementing job execution within a network based remote computing environment. The computer program product comprises a non-transitory computer usable medium having a computer readable program code embodied therein, the computer readable program code comprising instructions for implementing, the steps of (i) receiving at a secondary job manager machine from a primary job manager machine, a secondary job execution request identifying a job for execution within the remote computing environment, wherein receiving the secondary job execution request at the secondary job manager machine is preceded by the primary job manager machine (a) receiving a primary job execution request from a job execution requesting device, wherein the primary job execution request comprises a request for execution of the identified job within the remote computing environment, (b) selecting the secondary job manager machine from among a plurality of secondary job manager machines assigned to the primary job manager machine, and (c) transmitting the secondary job execution request to the secondary job manager machine, wherein the transmitted secondary job execution request is generated based on the primary job execution request, (ii) selecting from among a plurality of computing machines assigned to the secondary job manager machine, at least one computing machine for execution of one or more computing tasks corresponding to the job specified in the secondary job execution request, (iii) transmitting to the selected at least one computing machine, one or more data messages comprising instruction(s) for implementing execution of the one or more computing tasks, (iv) receiving at the secondary job manager machine, output data comprising execution output of the one or more computing tasks, wherein said output data is generated and transmitted by the at least one computing machine, and (v) transmitting the received output data to a target recipient device (e.g. the job execution requesting device, or a specified intended recipient device).

BRIEF DESCRIPTION OF THE ACCOMPANYING DRAWINGS

DETAILED DESCRIPTION

Figure 1:
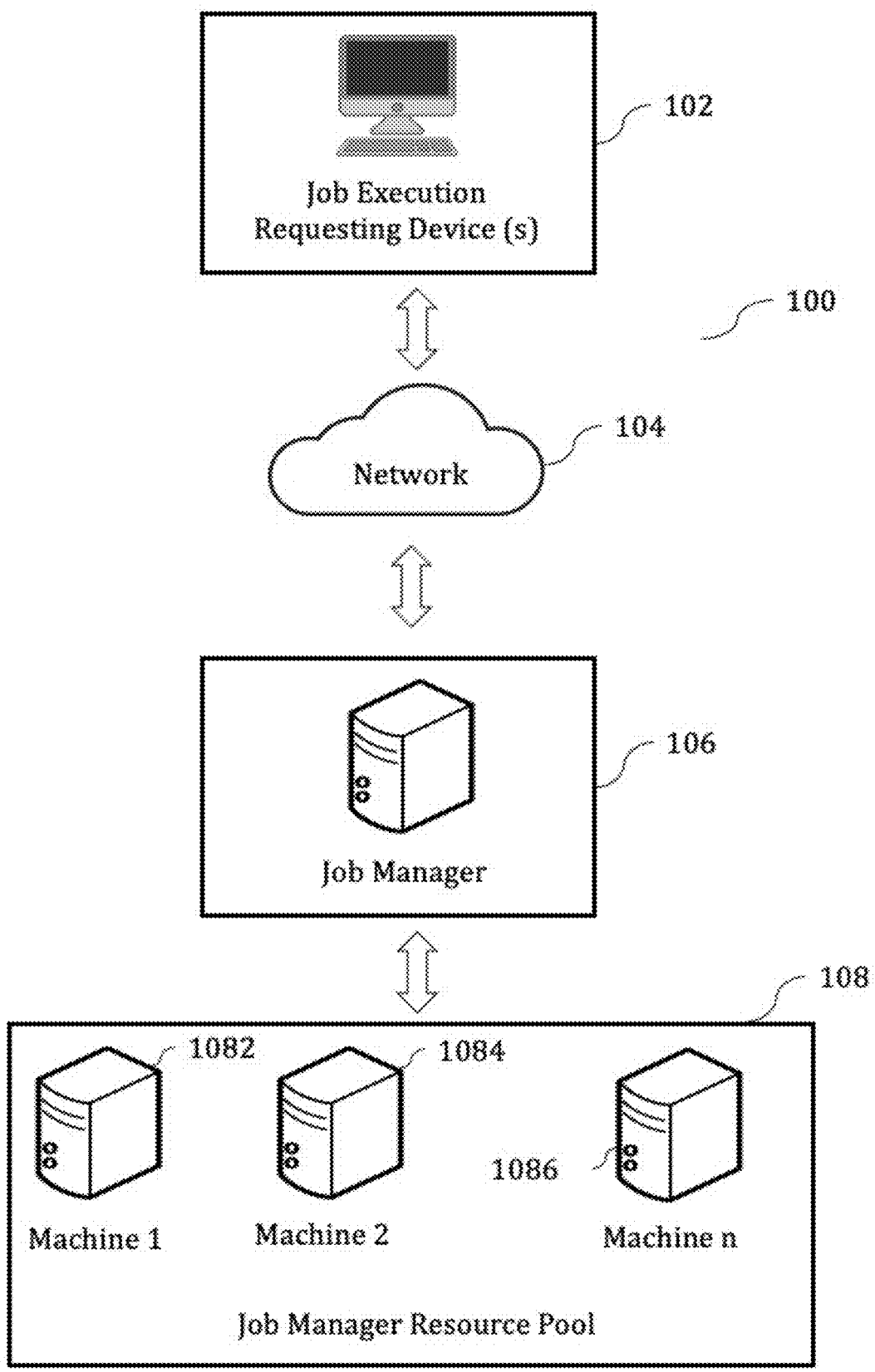
FIG. 1 illustrates a conventional system environment for remote computing environment based execution of jobs.
Figure 2:
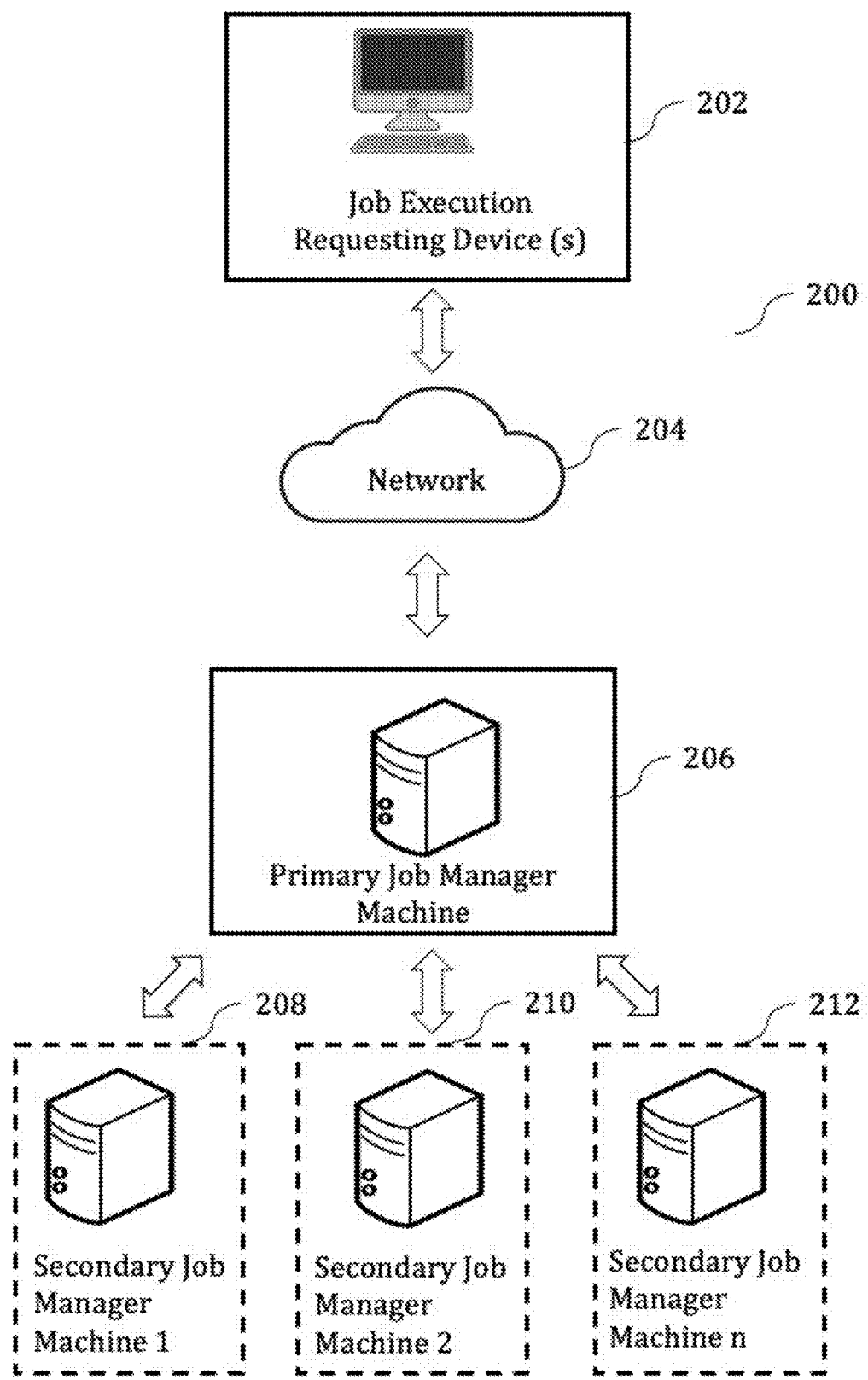
FIGS. 2 to 4A illustrate embodiments of a scalable job manager architecture for remote computing environment based job execution in accordance with the teachings of the present invention.
Figure 3:
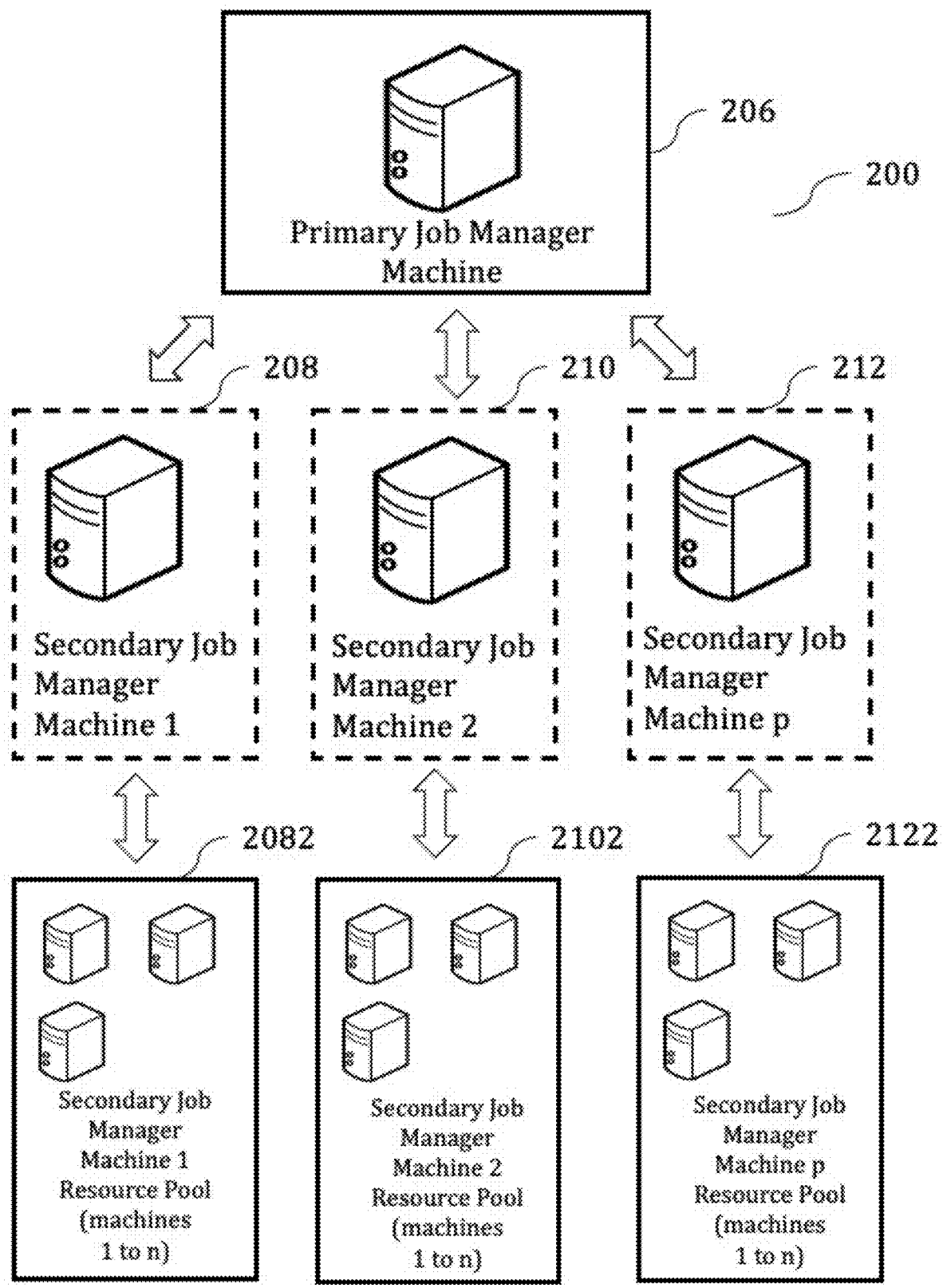

The present invention provides methods, systems and computer program products for job management and for allocating resources for cloud based or remote computing environment based job processing.

In various embodiments, the invention provides scalable job manager architectures for remote computing environment based job execution.

FIGS. 2 to 4A illustrate embodiments of a scalable job manager architecture for remote environment based job execution in accordance with the teachings of the present invention.

The embodiments of remote computing environment 200 that are illustrated in FIGS. 2 to 4A are configured such that jobs intended for execution within a remote computing environment are transmitted to the remote computing environment from a job execution requesting device(s) 202 via a network 204.

The remote computing environment 200 includes a hierarchical job manager architecture comprising a primary job manager machine 206. The primary job manager machine 206 has a plurality of secondary job manager machines 1 to p (208 to 212) assigned to and/or communicatively coupled with primary job manager machine 206. Primary job manager machine 206 may be communicably coupled with each of the 1 to p secondary job manager machines (208, 210, 212) over a communication network. In a more specific embodiment, each of the 1 to p secondary job manager machines (208, 210, 212) is coupled with primary job manager machine 206 in a master-slave arrangement, where each secondary job manager machine is slaved to (or controlled by) primary job manager machine 206.

The primary (or master) job manager machine 206 can instantiate or couple (and can terminate or decouple from) one or more additional secondary (slave) job manager machines, as and when the job load increases. Jobs or job execution requests transmitted to the remote computing environment via network 204 are received by primary job manager machine 206, which selects one or more of the secondary job manager machines 208 to 212 coupled therewith for performing the job, and forwards the job/a job execution request to the selected secondary job manager(s) for execution.

Each of the plurality of secondary job manager machines 1 to p (208 to 212) has access to and effects performance of received jobs through a corresponding job manager resource pool assigned to (and/or controlled by) that particular secondary job manager machine. So in FIGS. 3 to 4A, secondary job manager machine 1 (208) has access to and controls secondary job manager machine 1 resource pool 2082, secondary job manager machine 2 (210) has access to and controls secondary job manager machine 2 resource pool 2102, and secondary job manager machine p (212) has access to and controls secondary job manager machine p resource pool 2122. Each secondary job manager machine resource pool comprises a plurality of machines (i.e. computing machines or computing resources) 1 to n. Jobs assigned to a secondary job manager machine by the primary job manager machine may be distributed among the plurality of machines within the corresponding secondary job manager machine resource pool for execution. It will be understood that the number of machines within each secondary job manager machine resource pool 2082, 2102, 2122 is not necessarily the same across each resource pool.

The number of secondary job manager machines within the remote environment 200 can be dynamic. Implemented within the primary job manager machine 206 are one or more processes (e.g. one or more master processes) which communicate with all secondary job manager machines 208 to 212 that are controlled by primary job manager machine 206, through a corresponding process (e.g. a slave process) running on each secondary job manager machine 208 to 212. The master and slave processes communicate and exchange information as and when needed.

In an embodiment, all secondary job manager machines 208 to 212 are of the same level within the hierarchy. Therefore jobs can be sent to any secondary job manager machine 208 to 212 by the primary job manager machine 206.

The secondary job manager machines 208 to 212 can be distributed at different locations and/or on different networks. The primary job manager machine 206 receives jobs or job execution requests from client machines (i.e. from one or more job execution requesting device(s) 202)—and for each job or job execution request, selects a secondary job manager machine from among the plurality of secondary job manager machines 208 to 212 that are assigned to (or associated with, or communicatively coupled with, or slaved to, or controlled by) the primary job manager machine 206. The job or job execution request is forwarded to the selected secondary job manager machine, by the primary job manager machine 206, for execution.

When a secondary job manager machine 208 to 212 receives a job or job request from a primary job manager 206 to which it is assigned (or with which it is associated, communicatively coupled, slaved, or controlled by), it selects one or more free computing machine(s) within its corresponding secondary job manager machine resource pool—while ensuring that the selected computing machine(s) meets the job requirements (number of cores or number and type of central processing unit (CPU), memory etc.) and sends the job, or job execution request, or one or more computing tasks that comprise a part or the whole of said job, to the selected computing machine(s). If no computing machines are free, the secondary job manager machine may queue the job or job request or computing tasks, and may try to find a suitable computing machine within its corresponding secondary job manager machine resource pool, that is free. If a computing machine to which a job or job execution request or one or more computing tasks is allocated for execution, crashes while running an assigned job or computing task, the responsible secondary job manager machine will re-allocate and re-run on a different computing machine, the job or job execution request or one or more computing tasks, that was running while the computing machine crashed. Thus the secondary job manager machine is configured to receive jobs or job execution requests for execution from the primary job manager machine, and is responsible for running the job if an appropriate computing machine resource is available within the corresponding secondary job manager machine resource pool.

Upon completion of execution of a job or one or more computing tasks that comprise part or whole of a job, by a computing machine to which the job or computing task(s) has been assigned by a secondary job manager machine, the secondary job manager machine receives the output/output data corresponding to the completed job, and transmits this output/output data back to job execution requesting device 202 (either through the primary job manager 206 or via another network route) or to another target recipient device that has been specified as the intended recipient of the output/output data. In a specific embodiment, upon completion of execution of a job or one or more computing tasks that comprise part or whole of a job, by a computing machine to which the job or computing task(s) has been assigned by a secondary job manager machine, the secondary job manager machine receives the output/output data corresponding to the completed job, and transmits this output/output data back to job execution requesting device 202 (or to another target recipient device that has been specified as the intended recipient of the output/output data) via a network route that bypasses the primary job manager machine 206.

The above described hierarchical structure provides advantages over prior art solutions—for the reason that the number of secondary job manager machines can be dynamically increased, thereby avoiding the creation of bottlenecks in the manner that is regularly experienced in prior art remote computing environments which rely on a single job manager machine for receiving, queuing and distributing jobs among available computing machine resources.

Figure 4:
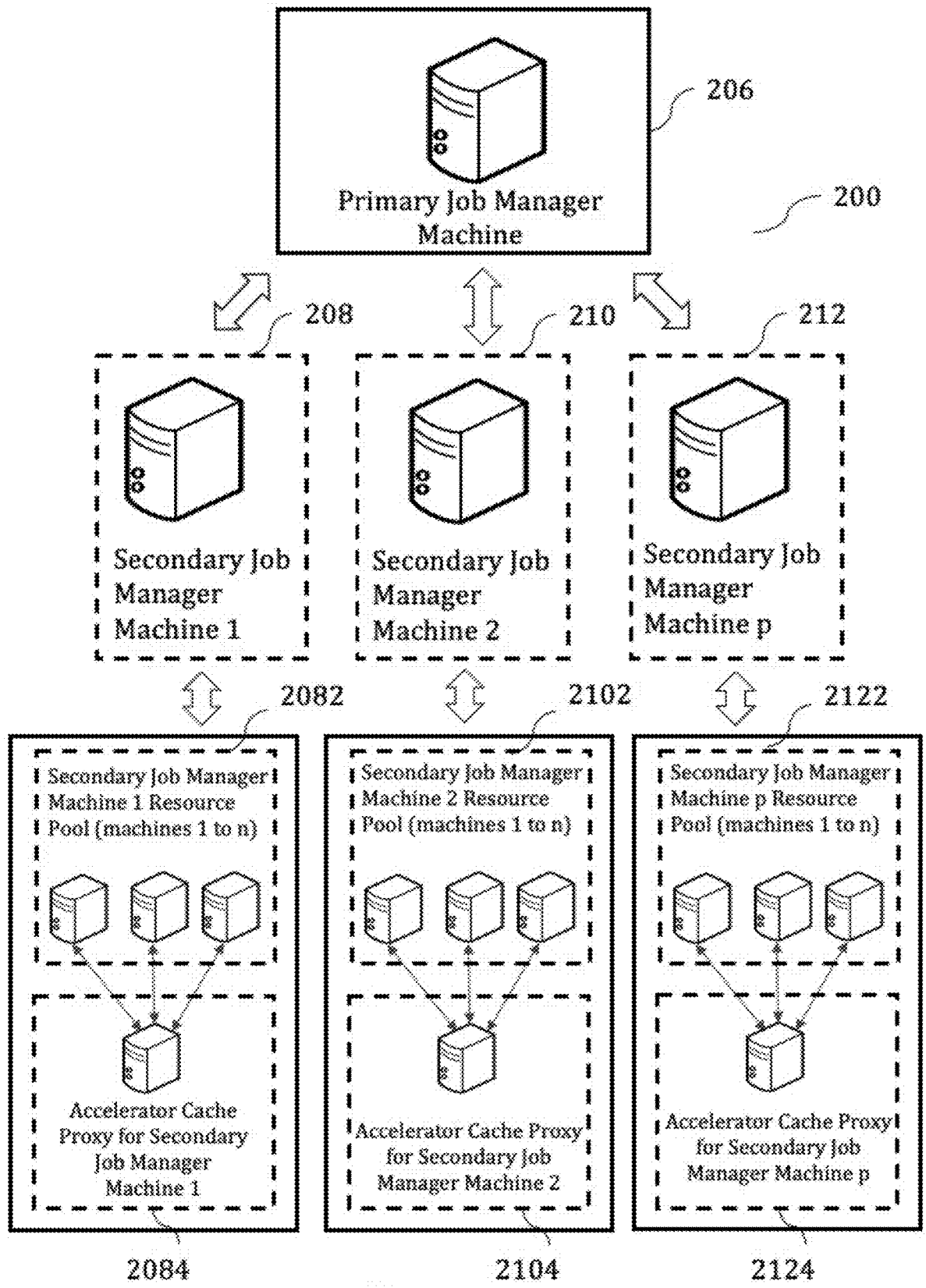

Additionally, as shown in FIG. 4, each secondary job manager machine 208 to 212 has at least one (or more than one) discrete instance of an accelerator cache proxy 2084, 2104, 2124 assigned thereto or coupled therewith. Each discrete instance of an accelerator cache proxy 2084 to 2124 comprises an application environment instance that is generated or implemented within a memory within or coupled with the corresponding secondary job manager machine 208 to 212. The application environment instance is a local instance of an application environment that provides executing computing machine(s) (that are being used by the secondary job manager machine for execution of a job or a computing task), with access to application software data objects and user generated data objects that are required for execution of the job by the executing computing machine(s). In various embodiments, the application environment instance of each discrete instance of an accelerator cache proxy 2084 to 2124 may comprise any of the application environment instance embodiments that have been described in U.S. Pat. No. 11,169,864 B2—the contents whereof are incorporated in their entirety herein.

Figure 4A:
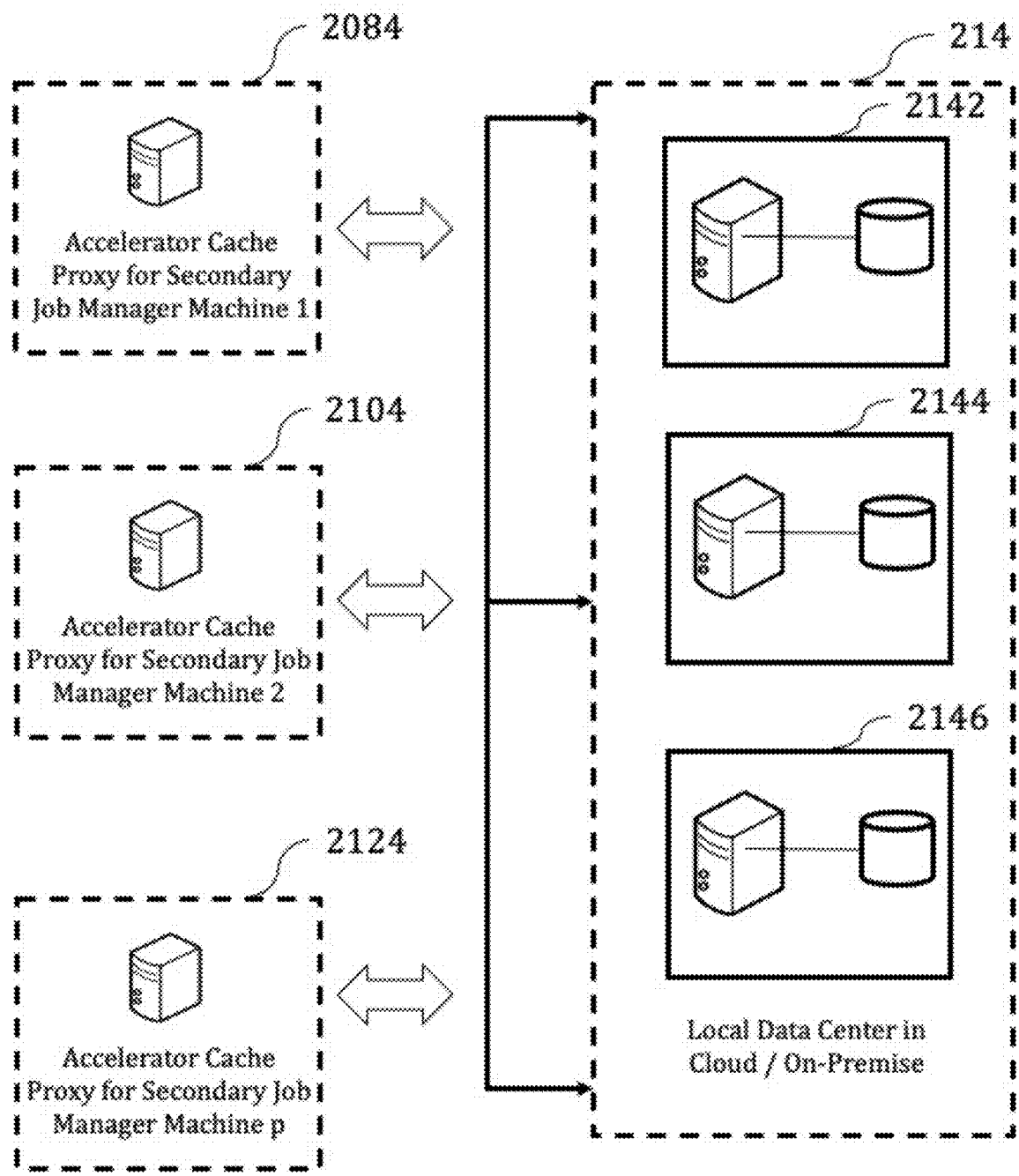

As shown in FIG. 4A, each accelerator cache proxy 2084, 2104, 2124 corresponding to each secondary job manager machine 208, 210, 212, obtains from a local data center or from an on-premise device 214, 2142, 2144, 2146 (i.e. a computing device that is located external to remote computing environment 200), the various software data objects and user generated data objects required for execution of a particular job or of one or more computing tasks comprising part or whole of said particular job, by one or more computing machines within the secondary job manager machine resource pool that corresponds to the same secondary job manager machine. This enables the accelerator cache proxy 2084, 2104, 2124 to provide low latency access to such software data objects and user generated data objects for computing machines within the corresponding secondary job manager machine resource pool when such computing machines are executing a job assigned by the secondary job manager machine.

In an embodiment, each secondary job manager machine 208, 210, 212 is configured to instantiate a discrete instance of an accelerator cache proxy 2084, 2104, 2124 for each separate user/client/device from which jobs are received. Therefore, if a secondary job manager machine is simultaneously handling multiple jobs that originated from a single user/single client machine, all of those multiple jobs may use a single instance of the accelerator cache proxy 2084, 2104, 2124 that has been instantiated for that specific user/client machine. By way of further explanation, in this embodiment, if jobs from two different users/two different clients/two different devices are handled by the secondary job manager machine, each one will retrieve data from a separate instance of an accelerator cache proxy 2084, 2104, 2124 instantiated by the secondary job manager machine. On the other hand, if jobs (or computing tasks that comprise part or whole of a job) from a single user/device/client machine are distributed by the primary job manager machine 206 across two separate secondary job manager machines 208, 210, 212, the jobs or computing tasks handled by the first of the two secondary job manager machines will access data objects from a first accelerator cache proxy that is instantiated by the first of the secondary job managers machine, and the jobs or computing tasks handled by the second of the secondary job managers machines will access data objects from a second accelerator cache proxy that is instantiated by the second of the secondary job manager machines.

In another embodiment, each secondary job manager machine 208, 210, 212 is configured to instantiate a discrete instance of an accelerator cache proxy 2084, 2104, 2124 for each separate remote application instance which has generated the received jobs. Therefore if a secondary job manager machine 208, 210, 212 is simultaneously handling multiple jobs that relate to a single remote application instance, all of those multiple jobs will use a single instance of the accelerator cache proxy 2084, 2104, 2124 that has been instantiated for that specific user/client/device. Thus, if jobs from two different remote application instances are handled by the same secondary job manager machine 208, 210, 212, the respective computing machines executing each of the two jobs (or computing tasks corresponding to each of the two jobs) will access or retrieve data from a separate instance of accelerator cache proxies 2084, 2104, 2124 instantiated by the concerned secondary job manager machine. On the other hand, if jobs from a single remote application instance are distributed by the primary job manager machine 206 across two separate secondary job manager machines 208, 210, 212, the jobs (and computing tasks associated with such jobs) handled by the first of the secondary job manager machines will access data objects from a first instance of an accelerator cache proxy 2084, 2104, 2124 that is instantiated by the first of the secondary job manager machines, and the jobs (and computing tasks associated with such jobs) handled by the second of the secondary job manager machines will access data objects from a second instance of an accelerator cache proxy 2084, 2104, 2124 that is instantiated by the second of the secondary job manager machines.

Figure 5:
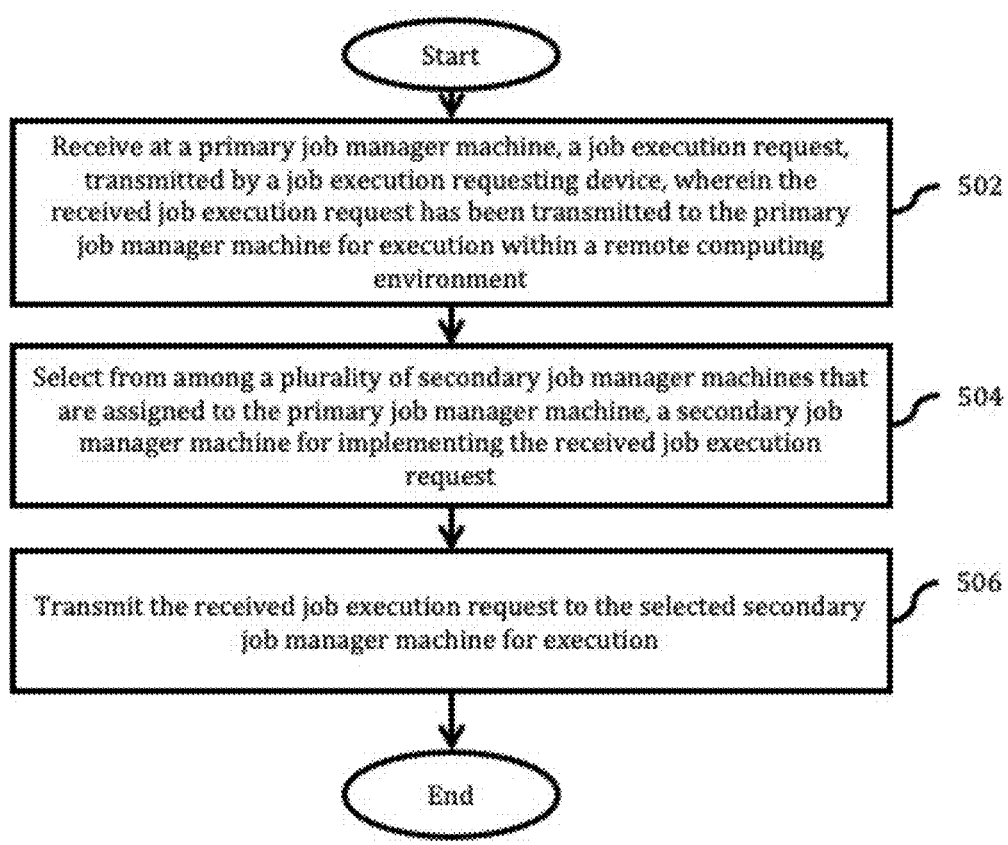
FIG. 5 is a flowchart illustrating a method for assigning a job execution request from a primary job manager machine to a secondary job manager machine, as implemented within the scalable job manager architecture of the present invention.

FIG. 5 is a flowchart illustrating a method for assigning a job execution request from a primary job manager machine to a secondary job manager machine, as implemented within the scalable job manager architecture of the present invention. In an embodiment, the method of FIG. 5 is implemented at a processor based primary job manager machine 206, which has one or more secondary job manager machines 208 to 212 that are coupled with, assigned to, controlled by, or slaved to primary job manager machine 206.

Step 502 comprises receiving at a primary job manager machine 206, a job execution request, transmitted by a job execution requesting device 202. The received job execution request has been transmitted to the primary job manager machine for execution of one or more jobs identified in said request, within remote computing environment 200.

Step 504 comprises selecting from among the plurality of secondary job manager machines 208, 210, 212, a secondary job manager machine for implementing the received job execution request. The selection of the secondary job manager machine by the primary job manager machine 206 for implementing a job identified within the received job execution request may be based on any one or more selection/distribution/job management/load balancing rules, criteria or policies, including without limitation, rules, criteria or policies that enable selection of a secondary job manager machine based on any of hardware capabilities, software capabilities, current load, available network bandwidth and current response times associated with each of secondary job manager machines 208, 210, 212, and/or based on the processing requirements and/or service level requirements associated with the job or one or more computing tasks associated with the job.

Step 506 comprises transmitting the received job execution request (or a modified or regenerated job execution request that is generated based on the received job execution request) to the selected secondary job manager machine for execution of the job(s) identified therewithin.

Figure 6:
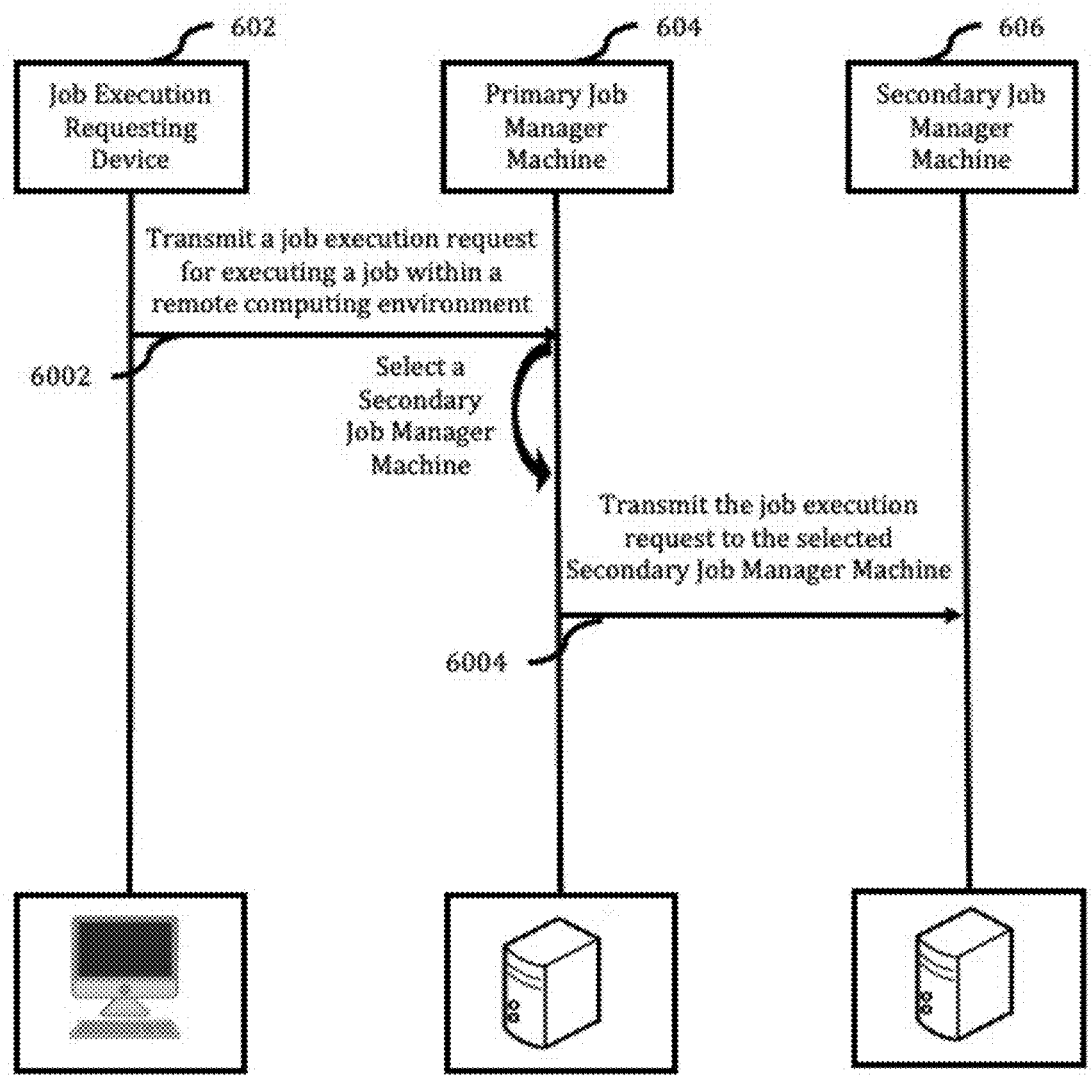
FIG. 6 is a communication flow diagram illustrating communication flow between system entities in implementing the method of FIG. 5.

FIG. 6 is a communication flow diagram illustrating communication flow between system entities in implementing the method of FIG. 5.

Step 6002 comprises transmitting from job execution requesting device 602, to primary job manager machine 604, a job execution request. The job execution request is transmitted to the primary job manager machine 604 for execution of one or more jobs identified in said request, within remote computing environment 200.

Primary job manager machine 604 thereafter selects from among a plurality of secondary job manager machines (that are assigned to primary job manager machine 604), a secondary job manager machine 606 for implementing the received job execution request. The selection of the secondary job manager machine 606 by the primary job manager machine 604 for implementing the received job execution request may be based on any one or more distribution/job management/load balancing rules, criteria or policies, including without limitation, rules, criteria or policies that enable selection of a secondary job manager machine based on any of hardware capabilities, software capabilities, current load, available network bandwidth and current response times associated with each of the secondary job manager machines that are coupled with, assigned to, controlled by, or slaved to primary job manager machine 604, and/or based on the processing requirements and/or service level requirements associated with the job or one or more computing tasks associated with the job.

Step 6004 comprises transmitting the received job execution request (or a modified or regenerated job execution request that is generated based on data extracted from the received job execution request) to the selected secondary job manager machine 606 for execution of the job(s) identified therewithin.

Figure 7:
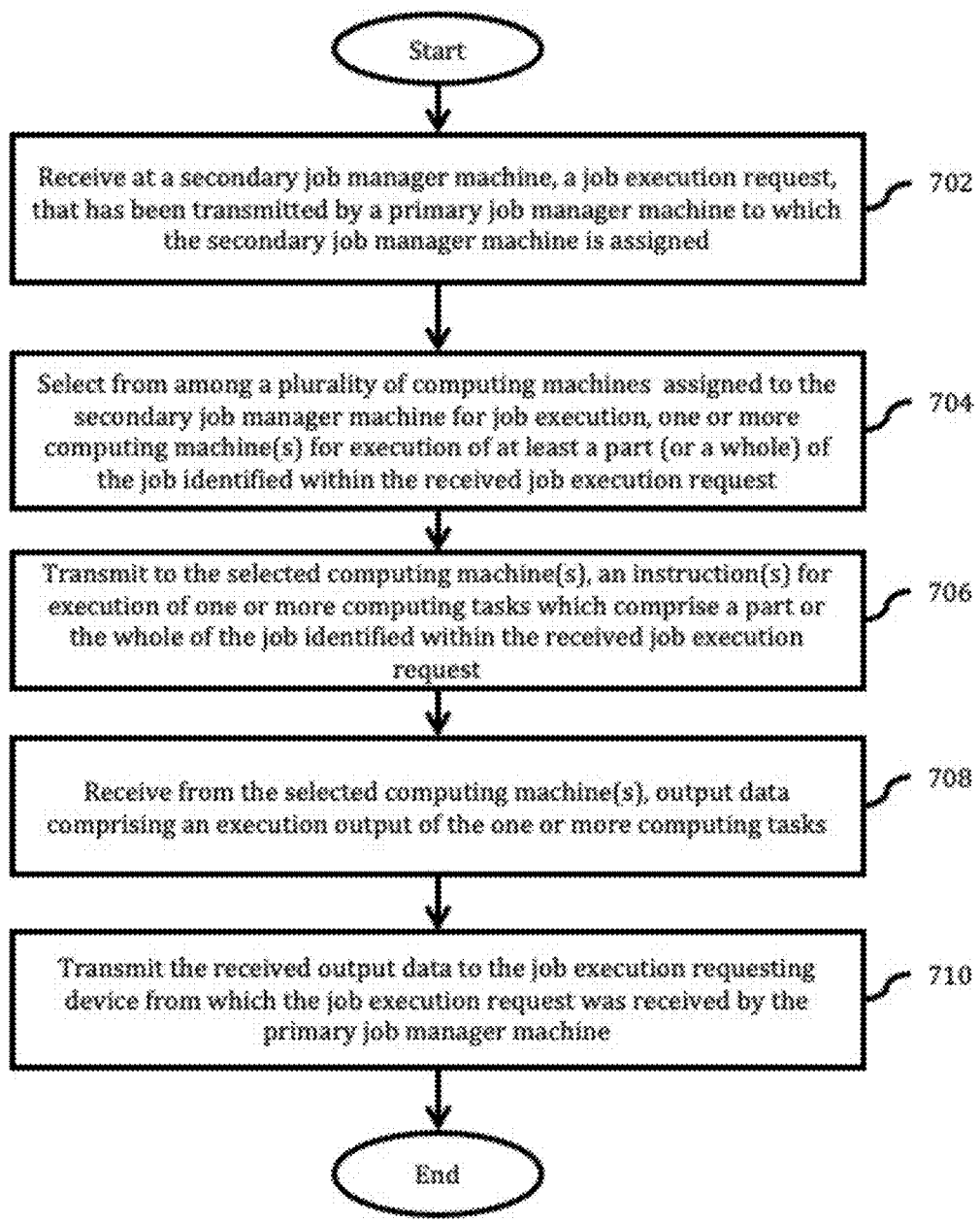
FIG. 7 is a flowchart illustrating a method for assigning a job execution request from a secondary job manager machine to a computing machine and subsequent execution of the requested job by the computing machine, as implemented within the scalable job manager architecture of the present invention.

FIG. 7 is a flowchart illustrating a method for assigning a job execution request from a secondary job manager machine to a computing machine and subsequent execution of the requested job by the computing machine, as implemented within the scalable job manager architecture of the present invention. In an embodiment, the method of FIG. 7 is implemented at a secondary job manager machine 208, 210, 212, which has been selected by a primary job manager machine 206 in accordance with the method steps of FIG. 5. In an embodiment, one or more of the method steps of the method of FIG. 7 are executed subsequent to execution of step 506 of the method of FIG. 5.

Step 702 comprises receiving at a secondary job manager machine (i.e. at the secondary job manager machine that has been selected by a primary job manager machine 206 in accordance with the method steps of FIG. 5), a job execution request, that has been transmitted by the primary job manager machine 206 to said secondary job manager machine.

Step 704 comprises selecting from among a plurality of computing machines assigned to the secondary job manager machine for implementing job execution, one or more than one computing machines for execution of at least a part of the job identified within the received job execution request. The plurality of computing machines may comprise the set of machines that comprise a resource pool of computing machines (for example, secondary job manager machine resource pools 2082, 2102, 2122) that have been assigned to the selected secondary job manager machine. Selection of one or more computing machines from among the plurality of computing machines may be based on any one or more selection/distribution/job management/load balancing rules, criteria or policies, including without limitation, rules, criteria or policies that enable selection of computing machines based on any of hardware capabilities, software capabilities, current load, available network bandwidth and current response times associated with each computing machine within the plurality of computing machines that have been assigned to the secondary job manager machine for implementing job execution, and/or based on the processing requirements and/or service level requirements associated with the job or one or more computing tasks associated with the job.

Step 706 comprises transmitting to the one or more selected computing machine(s), one or more data messages comprising instruction(s) for execution of one or more computing tasks which comprise a part or the whole of the job identified within the job execution request that has been received by the secondary job manager machine from primary job manager machine 206.

Subsequent to execution of the computing tasks that have been assigned for execution to the one or more selected computing machine(s) (and which are identified in the one or more instructions transmitted at step 706), by the one or more selected computing machine(s), step 708 comprises receiving at the secondary job manager machine, from the selected one or more computing machine(s), output data comprising execution output of the one or more computing tasks.

Step 710 comprises transmitting (by the secondary job manager machine) the received output data, to the job execution requesting device 202 from which the job execution request was received by primary job manager machine 206. The output data may be transmitted by the secondary job manager machine to the job execution requesting device 202 (or to a target computing device that has been identified as an intended recipient of the output data), either through the primary job manager 206 or via another network route. In a specific embodiment, upon completion of execution of a job or one or more computing tasks that comprise part or whole of a job, by one or more computing machines to which the job or computing task(s) has been assigned by the secondary job manager machine, the secondary job manager machine receives the output/output data corresponding to the completed job, and transmits this output/output data back to job execution requesting device 202 (or to a target computing device that has been identified as an intended recipient of the output data) via a network route that bypasses the primary job manager machine 206.

Figure 8:
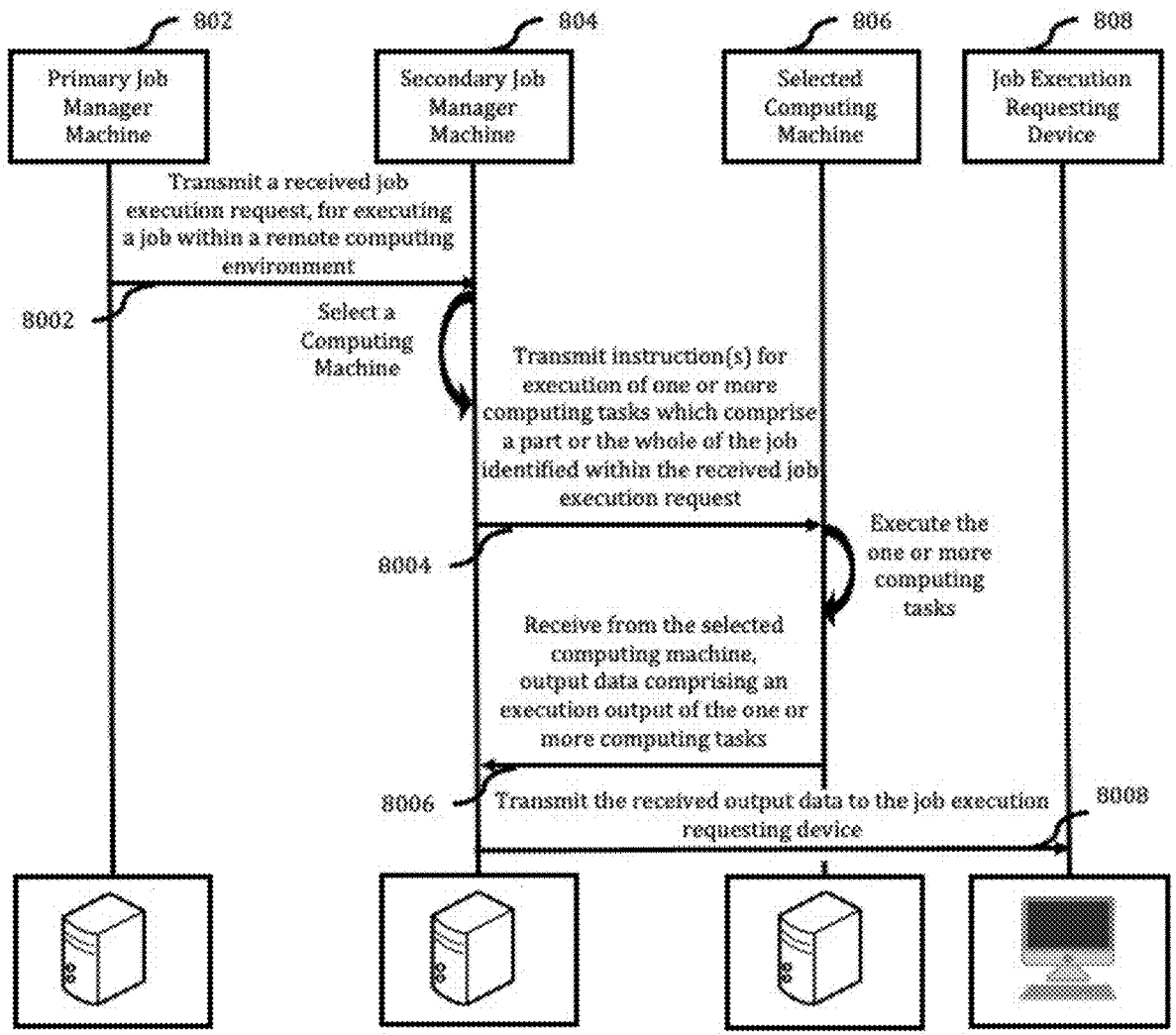
FIG. 8 is a communication flow diagram illustrating communication flow between system entities in implementing the method of FIG. 7.

FIG. 8 is a communication flow diagram illustrating communication flow between system entities in implementing the method of FIG. 7.

Step 8002 comprises receiving at a secondary job manager machine 804 (i.e. the secondary job manager machine that has been selected by a primary job manager machine 802 in accordance with the method steps of FIG. 5), a job execution request, that has been transmitted by the primary job manager machine 802 to said secondary job manager machine 804.

Secondary job manager machine 804 selects from among a plurality of computing machines assigned to the secondary job manager machine 804 for implementing job execution, at least one computing machine for execution of at least a part of the job identified within the received job execution request. The plurality of computing machines may comprise the set of machines that comprise a resource pool of computing machines that have been assigned to the secondary job manager machine 804. Selection of one or more computing machines from among the plurality of computing machines may be based on any one or more selection/distribution/job management/load balancing rules, criteria or policies, including without limitation, rules, criteria or policies that enable selection of computing machines based on any of hardware capabilities, software capabilities, current load, available network bandwidth and current response times associated with each computing machine within the plurality of computing machines that have been assigned to the secondary job manager machine 804 for implementing job execution, and/or based on the processing requirements and/or service level requirements associated with the job or one or more computing tasks associated with the job.

Step 8004 comprises transmitting to the at least one selected computing machine 806, one or more instruction(s) for execution of one or more computing tasks which comprise a part or the whole of the job identified within the job execution request that has been received by the secondary job manager machine 804 from primary job manager machine 802.

The at least one selected computing machine 806, executes the one or more computing tasks identified within the transmitted instruction(s).

Subsequent to execution of the computing tasks that have been assigned for execution to the at least one selected computing machine 806 (and which are identified in the instruction(s) transmitted at step 8004) by the at least one selected computing machine 806, step 8006 comprises receiving at the secondary job manager machine 804, from the at least one selected computing machine 806, output data comprising execution output of the one or more computing tasks.

Step 8008 comprises transmitting (by the secondary job manager machine 804) the received output data, to the job execution requesting device 808 from which the job execution request was received by primary job manager machine 802, or to a target computing device that has been identified as an intended recipient of the output data. The output data may be transmitted by the secondary job manager machine 804 to the job execution requesting device 808 (or to a target computing device that has been identified as an intended recipient of the output data), either through the primary job manager 802 or via another network route. In a specific embodiment, upon completion of execution of a job or one or more computing tasks that comprise part or whole of a job, by one or more computing machines 806 to which the job or computing task(s) has been assigned by the secondary job manager machine 804, the secondary job manager machine 804 receives the output/output data corresponding to the completed job, and transmits this output/output data back to job execution requesting device 808 (or to a target computing device that has been identified as an intended recipient of the output data) via a network route that bypasses the primary job manager machine 802.

Figure 9:
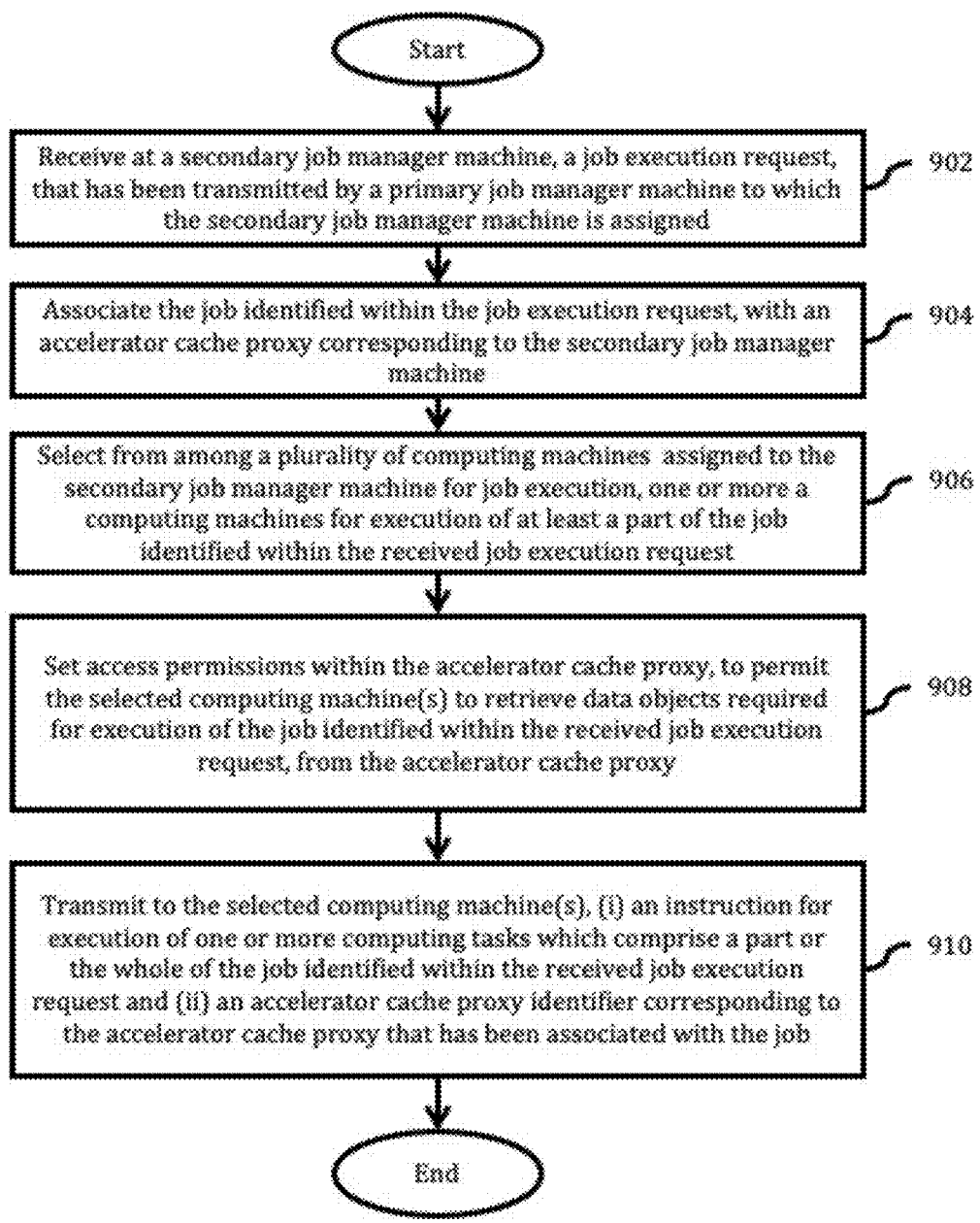
FIG. 9 is a flowchart illustrating a second method for assigning a job execution request from a secondary job manager machine to a computing machine and for execution of the requested job by the computing machine with the involvement of an accelerator cache proxy, as implemented within the scalable job manager architecture of the present invention.

FIG. 9 is a flowchart illustrating a second method for assigning a job execution request from a secondary job manager machine to a computing machine and for execution of the requested job by the computing machine with the involvement of an accelerator cache proxy, as implemented within the scalable job manager architecture of the present invention. In an embodiment, the method of FIG. 9 is implemented at a secondary job manager machine 208, 210, 212, which has been selected by a primary job manager machine 206 in accordance with the method steps of FIG. 5. In an embodiment, one or more of the method steps of the method of FIG. 7 are executed subsequent to execution of step 506 of the method of FIG. 5.

Step 902 comprises receiving at a secondary job manager machine (i.e. the secondary job manager machine that has been selected by a primary job manager machine 206 in accordance with the method steps of FIG. 5), a job execution request, that has been transmitted by the primary job manager machine 206 to said the secondary job manager machine.

Step 904 comprises associating the job identified within the job execution request, with an accelerator cache proxy corresponding to the secondary job manager machine. The secondary job manager machine has at least one (or more than one) discrete instance of an accelerator cache proxy 2084, 2104, 2124 assigned thereto or coupled therewith. Each discrete instance of an accelerator cache proxy 2084 to 2124 comprises an application environment instance that is generated or implemented within a memory within or coupled with the secondary job manager machine. The application environment instance is a local instance of an application environment that provides an executing computing machine(s) (that are being used by the secondary job manager for job execution or for execution of computing tasks associated with a job), with access to application software data objects and user generated data objects that are required for execution of the job by the executing computing machine(s).

In an embodiment, the accelerator cache proxy that is associated at step 904 with the job identified within the job execution request is one out of a set of accelerator cache proxies coupled with or controlled by the second job manager machine. In an embodiment, the accelerator cache proxy is configured to obtain from a local data center or from an on-premise device 214, 2142, 2144, 2146 (i.e. an external computing device/computing device that is external to remote computing environment 200), the various software data objects and user generated data objects required for execution of a particular job or one or more computing tasks comprising part or whole of said particular job, by one or more computing machines within the secondary job manager machine resource pool that corresponds to the same secondary job manager machine. This enables the accelerator cache proxy to provide low latency access to such software data objects and user generated data objects for computing machines within the corresponding secondary job manager machine resource pool when such computing machines are executing a job assigned by the secondary job manager machine.

In an embodiment of method step 904, associating the job identified within the job execution request with an accelerator cache proxy corresponding to the secondary job manager machine, comprises generating a data record or a data object correlating a unique job identifier corresponding to the job with a unique accelerator cache proxy identifier corresponding to the accelerator cache proxy.

Step 906 comprises selecting from among a plurality of computing machines assigned to the secondary job manager machine for job execution, one or more computing machines for execution of at least a part of the job identified within the received job execution request. The plurality of computing machines may comprise the set of machines that comprise a resource pool of computing machines (for example, secondary job manager machine resource pools 2082, 2102, 2122) that have been assigned to the secondary job manager machine. Selection of one or more computing machines from among the plurality of computing machines may be based on any one or more selection/distribution/job management/load balancing rules, criteria or policies, including without limitation, rules, criteria or policies that enable selection of computing machines based on any of hardware capabilities, software capabilities, current load, available network bandwidth and current response times associated with each computing machine within the plurality of computing machines that have been assigned to the secondary job manager machine for implementing job execution, and/or based on the processing requirements and/or service level requirements associated with the job or one or more computing tasks associated with the job.

Step 908 comprises setting/generating/modifying one or more access permissions within the accelerator cache proxy (that has been associated at step 904 with the job identified within the job execution request), to permit the selected computing machine(s) (that have been selected at step 906) to retrieve data objects required for execution of the job (or one or more computing tasks that are associated with or that comprise a part or a whole of the job) identified within the received job execution request (or that are required for execution of one or more computing tasks associated with said job), from the accelerator cache proxy.

Thereafter, step 910 comprises transmitting to the selected computing machine(s), one or more data messages comprising (i) an instruction for execution of one or more computing tasks which comprise a part or the whole of the job identified within the received job execution request and (ii) an accelerator cache proxy identifier corresponding to the accelerator cache proxy that has been associated with the job.

Subsequent to execution of the computing tasks that have been assigned for execution to the selected computing machine(s) (and which are identified in the one or more instructions transmitted at step 910) by the selected computing machine(s), the secondary job manager machine receives from the selected one or more computing machine(s), output data comprising execution output of the one or more computing tasks. The secondary job manager machine may thereafter transmit the received output data, to the job execution requesting device 202 (or to a target computing device that has been identified as an intended recipient of the output data) from which the job execution request was received by primary job manager machine 206. The output data may be transmitted by the secondary job manager machine to the job execution requesting device 202 (or to a target computing device that has been identified as an intended recipient of the output data), either through the primary job manager 206 or via another network route. In a specific embodiment, upon completion of execution of a job or one or more computing tasks that comprise part or whole of a job, by one or more selected computing machines to which the job or computing task(s) has been assigned by the secondary job manager machine, the secondary job manager machine receives the output/output data corresponding to the completed job, and transmits this output/output data back to job execution requesting device 202 (or to a target computing device that has been identified as an intended recipient of the output data) via a network route that bypasses the primary job manager machine 206.

Figure 10:
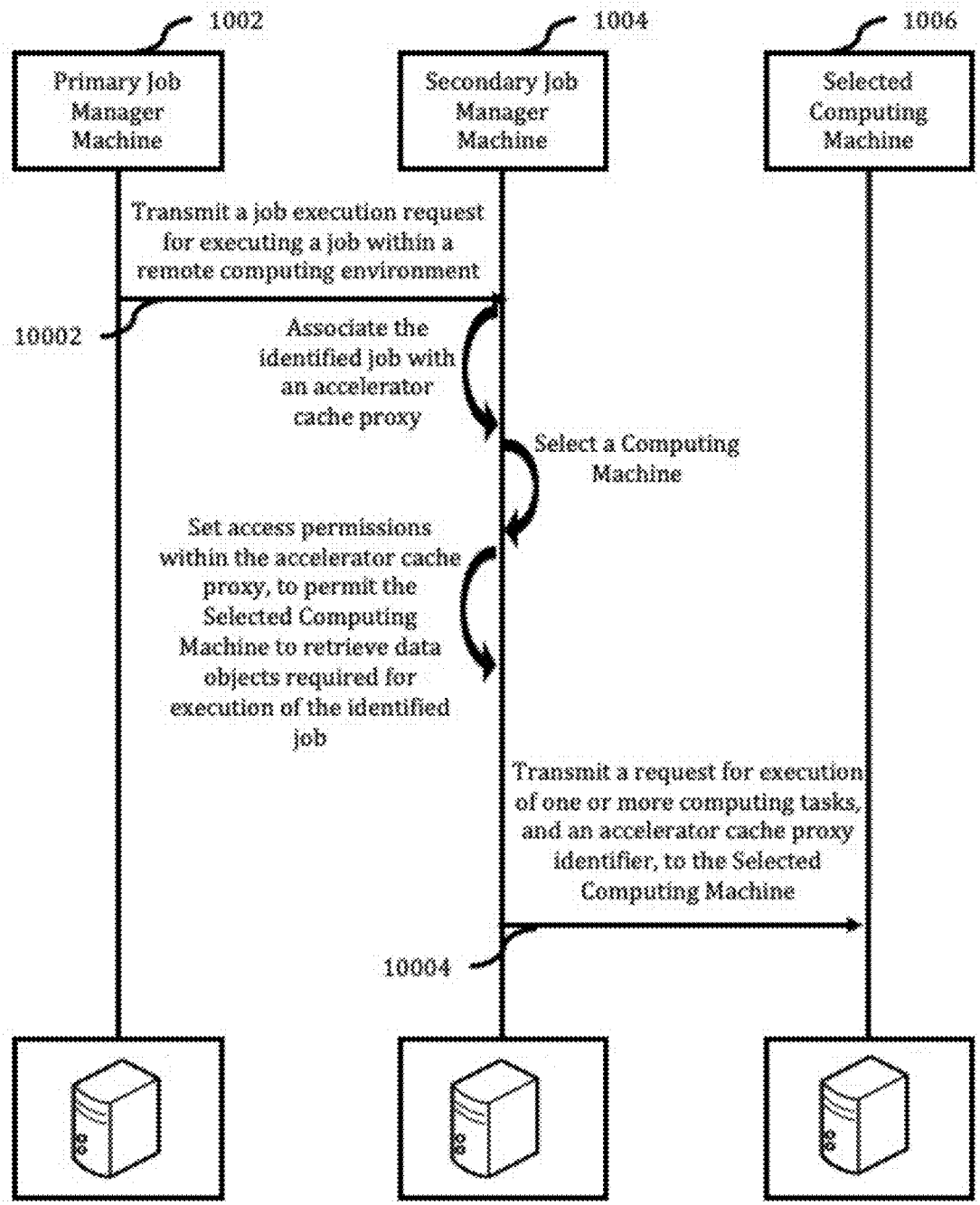
FIG. 10 is a communication flow diagram illustrating communication flow between system entities in implementing the method of FIG. 9.

FIG. 10 is a communication flow diagram illustrating communication flow between system entities in implementing the method of FIG. 9.

Step 10002 comprises transmitting from a primary job manager machine 1002 to a secondary job manager machine 1004 (i.e. a secondary job manager machine that has been selected by a primary job manager machine in accordance with the method steps of FIG. 5), a job execution request.

Secondary job manager machine 1004 associates the job identified within the job execution request, with an accelerator cache proxy corresponding to the secondary job manager machine 1004. The secondary job manager machine 1004 has at least one (or more than one) discrete instance of an accelerator cache proxy assigned thereto or coupled therewith. Each discrete instance of an accelerator cache proxy associated with the secondary job manager machine 1004 comprises an application environment instance that is generated or implemented within a memory within or coupled with the secondary job manager machine 1004. The application environment instance is a local instance of an application environment that provides executing computing machine(s) (that are being used by the secondary job manager for job execution or for execution of computing tasks associated with a job), with access to application software data objects and user generated data objects that are required for execution of the job by the executing computing machine(s).

The accelerator cache proxy that is associated by secondary job manager machine 1004 with the job identified within the job execution request, is one out of a set of accelerator cache proxies coupled with or controlled by the second job manager machine 1004. In an embodiment, the accelerator cache proxy is configured to obtain from a local data center or from an on-premise device (i.e. an external computing device/computing device that is external to the remote computing environment 200), the various software data objects and user generated data objects required for execution of a particular job or one or more computing tasks comprising part or whole of said particular job, by one or more computing machines within the secondary job manager machine resource pool that corresponds to the same secondary job manager machine 1004. This enables the accelerator cache proxy to provide low latency access to such software data objects and user generated data objects for computing machines within the corresponding secondary job manager machine resource pool when such computing machines are executing a job assigned by the secondary job manager machine 1004.

In an embodiment, associating the job identified within the job execution request with an accelerator cache proxy corresponding to the secondary job manager machine 1004, comprises generating a data record or a data object correlating a unique job identifier corresponding to the job with a unique accelerator cache proxy identifier corresponding to the accelerator cache proxy.

Secondary job manager machine 1004 thereafter selects from among a plurality of computing machines assigned to the secondary job manager machine 1004 for job execution, at least one computing machine 1006 for execution of at least a part of the job identified within the received job execution request. The plurality of computing machines may comprise the set of machines that comprise a resource pool of computing machines that have been assigned to the secondary job manager machine 1004. Selection of one or more computing machines 1006 from among the plurality of computing machines may be based on any one or more selection/distribution/job management/load balancing rules, criteria or policies, including without limitation, rules, criteria or policies that enable selection of computing machines based on any of hardware capabilities, software capabilities, current load, available network bandwidth and current response times associated with each computing machine within the plurality of computing machines that have been assigned to the secondary job manager machine 1004 for implementing job execution, and/or based on the processing requirements and/or service level requirements associated with the job or one or more computing tasks associated with the job.

Secondary job manager machine 1004 sets/generates/modifies access permissions within the accelerator cache proxy (that has been associated at step with the job identified within the job execution request), to permit the selected computing machine(s) (that have been selected by the secondary job manager machine 1004) to retrieve data objects required for execution of the job identified within the received job execution request (or that are required for execution of one or more computing tasks associated with said job), from the accelerator cache proxy.

Thereafter, step 10004 comprises transmitting to the selected computing machine(s) 1006, (i) an instruction for execution of one or more computing tasks which comprise a part or the whole of the job identified within the received job execution request and (ii) an accelerator cache proxy identifier corresponding to the accelerator cache proxy that has been associated with the job.

Figure 11:
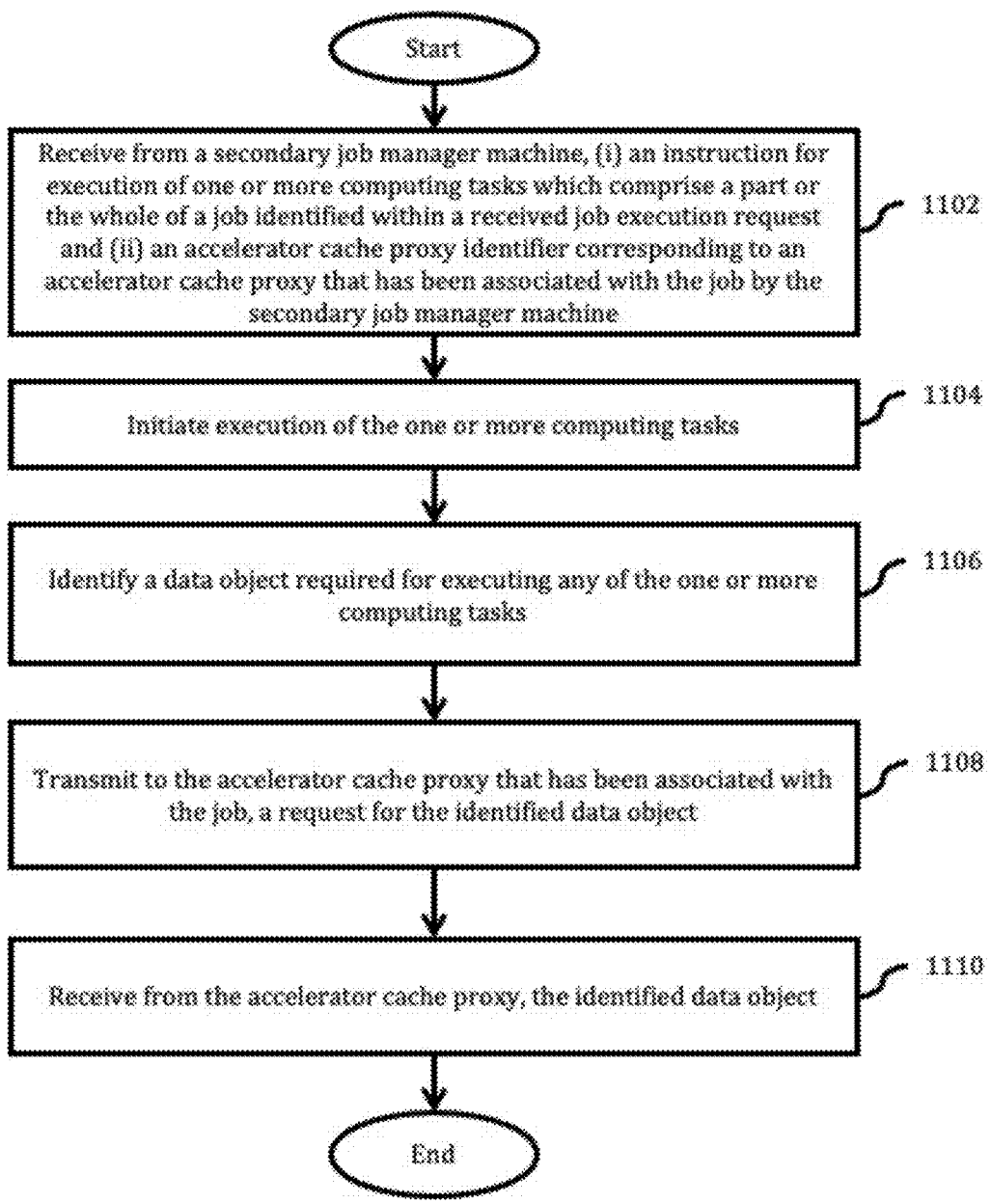
FIG. 11 is a flowchart illustrating a method for execution of one or more computing tasks associated with a job execution request, by a computing machine to which the one or more tasks have been assigned, with the involvement of an accelerator cache proxy, as implemented within the scalable job manager architecture of the present invention.

FIG. 11 is a flowchart illustrating a method for execution of one or more computing tasks associated with a job execution request, by a selected computing machine to which the one or more tasks have been assigned, with the involvement of an accelerator cache proxy, as implemented within the scalable job manager architecture of the present invention. In an embodiment, the method of FIG. 11 may be implemented within a computing machine(s) that has been selected by a secondary job manager machine for execution of a job or computing tasks associated with a job, in accordance with step 906 of the method of FIG. 9. In an embodiment, one or more of the method steps of the method of FIG. 11 are executed subsequent to execution of step 910 of the method of FIG. 9.

Step 1102 comprises receiving (at the selected computing machine) from the secondary job manager machine, (i) an instruction for execution of one or more computing tasks which comprise a part or the whole of a job identified within a received job execution request from a primary job manager 206 and (ii) an accelerator cache proxy identifier corresponding to an accelerator cache proxy that has been associated with the job by the secondary job manager machine.

Step 1104 comprises initiating execution of the one or more computing tasks by the selected computing machine.

Step 1106 comprises identifying a data object required for executing any of the one or more computing tasks by the selected computing machine.

Step 1108 comprises transmitting from the selected computing machine to the accelerator cache proxy that has been associated with the job, a request for the identified data object.

The accelerator cache proxy receives the request for the identified data object, retrieves the data objection and transmits it back to the selected computing machine. Step 1110 comprises the selected computing machine receiving the identified data object from the accelerator cache proxy, for use for executing any of the one or more of the computing tasks by the selected computing machine.

Figure 12:
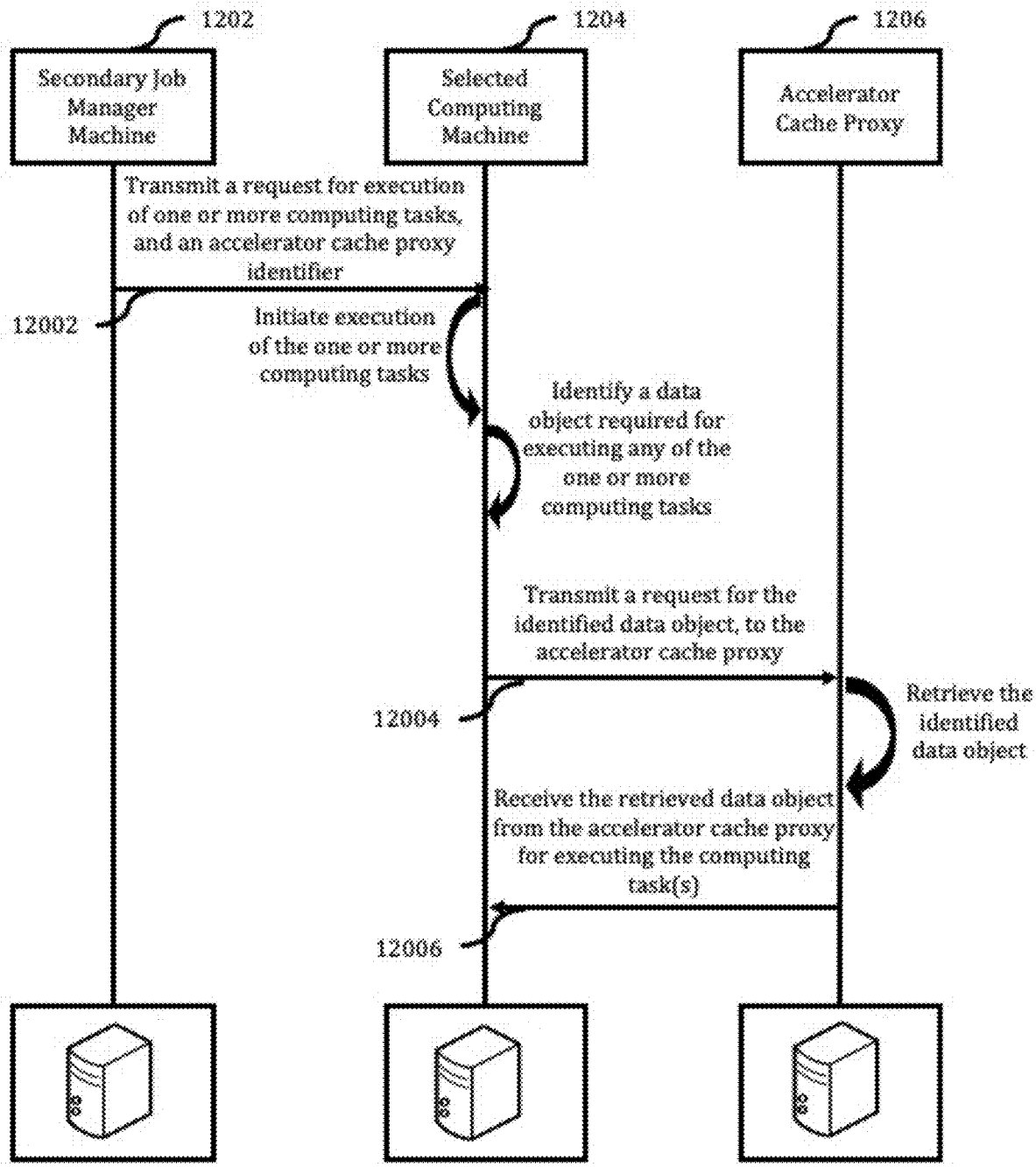
FIG. 12 is a communication flow diagram illustrating communication flow between system entities in implementing the method of FIG. 11.

FIG. 12 is a communication flow diagram illustrating communication flow between system entities in implementing the method of FIG. 11.

Step 12002 comprises transmitting from secondary job manager machine 1202 to selected computing machine 1204 (i) an instruction for execution of one or more computing tasks which comprise a part or the whole of a job identified within a received job execution request from a primary job manager and (ii) an accelerator cache proxy identifier corresponding to an accelerator cache proxy that has been associated with the job by the secondary job manager machine.

Selected computing machine 1204 has been selected by secondary job manager machine 1202, for execution of a job or computing tasks associated with a job, in accordance with step 906 of the method of FIG. 9.

The selected computing machine 1204 initiates execution of the one or more computing tasks, and subsequently identifies a data object required for executing any of the one or more computing tasks by the selected computing machine 1204.

Step 12004 comprises transmitting from the selected computing machine 1204 to the accelerator cache proxy 1206 that has been associated with the job, a request for the identified data object.

The accelerator cache proxy 1206 receives the request for the identified data object, retrieves the requested data object and transmits it back to the selected computing machine 1204. Step 12006 comprises the selected computing machine 1204 receiving the transmitted data object from the accelerator cache proxy 1206, for use for executing any of the one or more of the computing tasks by the selected computing machine.

Figure 13:
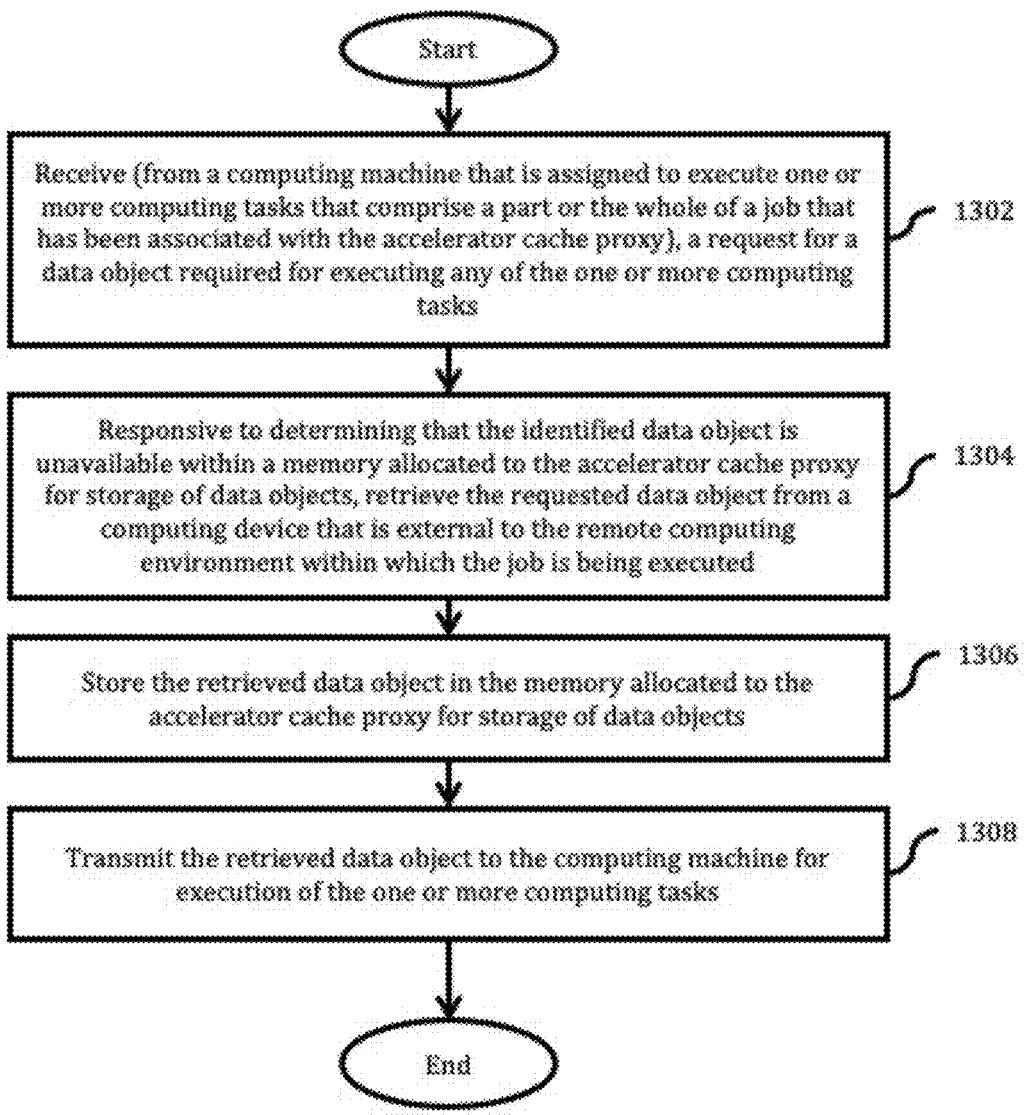
FIG. 13 is a flowchart illustrating a method for provisioning data objects required by a computing machine to which computing tasks have been assigned, through an accelerator cache proxy, as implemented within the scalable job manager architecture of the present invention.

FIG. 13 is a flowchart illustrating a method for provisioning data objects required by a computing machine to which computing tasks have been assigned, through an accelerator cache proxy, as implemented within the scalable job manager architecture of the present invention. In an embodiment, the method of FIG. 13 is implemented at an accelerator cache proxy that has been associated with a job identified within a job execution request, at step 904 of the method of FIG. 9. In an embodiment, one or more of the method steps of the method of FIG. 13 are executed between steps 1108 and 1110 of the method of FIG. 11.

Step 1302 comprises receiving a request for a data object required for executing any of the one or more computing tasks assigned to the computing machine. The request is received at the accelerator cache proxy that has been associated with a job identified within a job execution request, at step 904 of the method of FIG. 9, from the computing machine. The computing machine is the selected computing machine that has been assigned to execute one or more computing tasks that comprise a part or the whole of a job that has been associated with the accelerator cache proxy.

At step 1304, responsive to determining that the identified data object is unavailable within a memory allocated to the accelerator cache proxy for storage of data objects, the accelerator cache proxy retrieves the requested data object from a computing device that is external to the remote computing environment within which the job is being executed—for example, from an on-premise device, or from the job execution requesting device 202.

Step 1304 comprises storing the retrieved data object in the memory allocated to the accelerator cache proxy for storage of data objects.

Step 1306 comprises transmitting the retrieved data object to the computing machine for execution of the one or more computing tasks.

Figure 14:
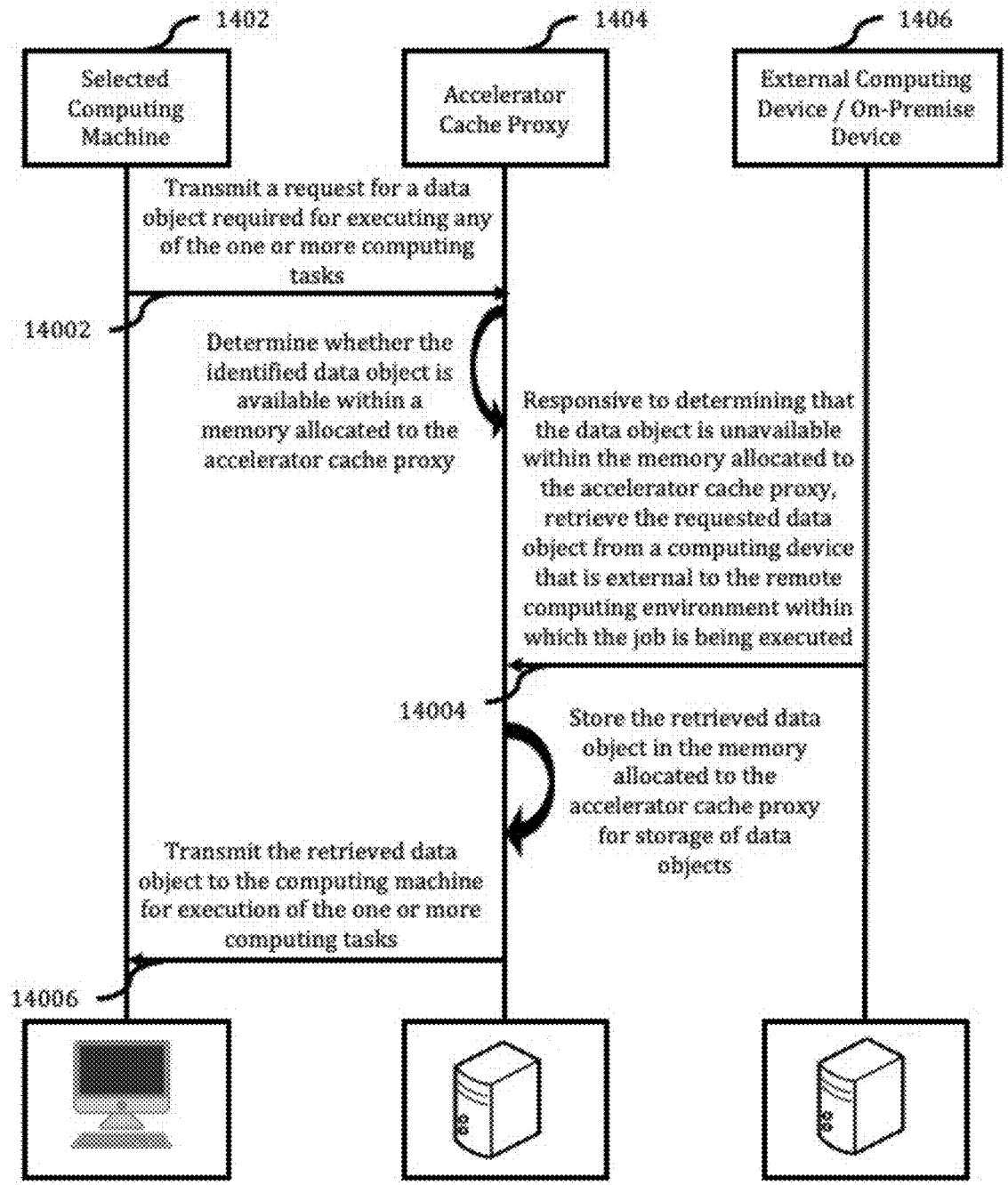
FIG. 14 is a communication flow diagram illustrating communication flow between system entities in implementing the method of FIG. 13.

FIG. 14 is a communication flow diagram illustrating communication flow between system entities in implementing the method of FIG. 13.

At step 14002, selected computing machine 1402 transmits a request for a data object that is required by the selected computing machine for the purposes of executing any of the one or more computing tasks that have been assigned to the selected computing machine 1402 by a secondary job manager machine in accordance with the methods of any of FIG. 7 or 9. The request is received at an accelerator cache proxy 1404 that has been associated with a job identified within a job execution request, at step 904 of the method of FIG. 9. Selected computing machine 1402 is a computing machine that has been assigned to execute one or more computing tasks that comprise a part or the whole of a job that has been associated with the accelerator cache proxy 1404.

Accelerator cache proxy 1404 determines whether the identified data object is available within a memory allocated to the accelerator cache proxy for storage of data objects. At step 14004, responsive to accelerator cache proxy 1404 determining that the identified data object is unavailable within a memory allocated to the accelerator cache proxy for storage of data objects, accelerator cache proxy 1404 retrieves the requested data object from an external computing device/on-premise device 1406 (i.e. a computing device that is external to the remote computing environment within which the job is being executed).

Accelerator cache proxy 1404 stores the retrieved data object in a memory allocated to the accelerator cache proxy for storage of data objects.

Step 14006 comprises transmitting the retrieved data object from accelerator cache proxy 1404 to selected computing machine 1402 for execution of the one or more computing tasks that have been assigned to it for execution by the secondary job manager machine in accordance with the methods of any of FIG. 7 or 9.

A particular embodiment of the present invention comprises a method for implementing job execution within a network based remote computing environment. The method comprises (i) receiving at a secondary job manager machine from a primary job manager machine, a secondary job execution request identifying a job for execution within the remote computing environment, wherein receiving the secondary job execution request at the secondary job manager machine is preceded by the primary job manager machine (a) receiving a primary job execution request from a job execution requesting device, wherein the primary job execution request comprises a request for execution of the identified job within the remote computing environment, (b) selecting the secondary job manager machine from among a plurality of secondary job manager machines assigned to the primary job manager machine, and (c) transmitting the secondary job execution request to the secondary job manager machine, wherein the transmitted secondary job execution request is generated based on the primary job execution request, (ii) selecting from among a plurality of computing machines assigned to the secondary job manager machine, at least one computing machine for execution of one or more computing tasks corresponding to the job specified in the secondary job execution request, (iii) transmitting to the selected at least one computing machine, one or more data messages comprising instruction(s) for implementing execution of the one or more computing tasks, (iv) receiving at the secondary job manager machine, output data comprising execution output of the one or more computing tasks, wherein said output data is generated and transmitted by the at least one computing machine, and (v) transmitting the received output data to a target recipient device (e.g. the job execution requesting device, or a specified intended recipient device).

In an embodiment of the method, transmission of the received output data from the secondary job manager machine to the target recipient device bypasses the primary job manager machine.

In a particular embodiment of the method, responsive to receiving the secondary job execution request from the primary job manager, the secondary job manager machine (i) associates the job identified within the secondary job execution request with an accelerator cache proxy corresponding to the secondary job manager machine, and (ii) sets one or more access permissions within the accelerator cache proxy to permit the selected at least one computing machine to retrieve from accelerator cache proxy, data objects required for execution of the one or more computing tasks—wherein the one or more data messages transmitted to the selected at least one computing machine includes an accelerator cache proxy identifier corresponding to the accelerator cache proxy that has been associated with the job.

In a further embodiment of the method, the secondary job manager machine selects the accelerator cache proxy for association with the job identified within the secondary job execution request, from among a set of discrete accelerator cache proxies assigned to the secondary job manager machine.

In a more specific embodiment of the method, each accelerator cache proxy within the set of discrete accelerator cache proxies assigned to the secondary job manager machine (i) comprises an application environment instance that is generated within a memory coupled with the secondary job manager machine, and (ii) is configured to obtain from a data center or computing device that is external to the remote computing environment, data objects required for execution of a job for execution within the remote computing environment that has been associated with said accelerator cache proxy by the secondary job manager machine.

In a specific embodiment of the method, the secondary job manager machine is configured to instantiate a discrete instance of an accelerator cache proxy for each distinct job executing requesting device, job execution requesting user, or remote application instance, from which one or more secondary job execution requests that have been are transmitted to the secondary job manager machine for execution within the remote computing environment, have originated.

In another embodiment of the method, the accelerator cache proxy associated with the job identified within the secondary job execution request is configured to respond to receiving a request for an identified data object from a requesting computing machine by (i) retrieving the identified data object, and (ii) transmitting the retrieved data object to the requesting computing machine—wherein the requesting computing machine is a computing machine from among the selected at least one computing machine.

In a particular method embodiment, responsive to a determination that the identified data object is unavailable within a memory allocated to the accelerator cache proxy that received the request for the identified data object, the step of retrieving the identified data object comprises (i) retrieving the requested data object from an on-premise device, or a job execution requesting device associated with the job identified within the secondary job execution request, and (ii) storing the retrieved data object in the memory allocated to the accelerator cache proxy that received the request for the identified data object.

In various method embodiments the job execution requesting device is external to the remote computing environment.

In another embodiment of the method the plurality of secondary job manager machines are assigned to the primary job manager machine in a master-slave configuration, such that each of the plurality of secondary job manager machines are slaved to the primary job manager machine.

In an exemplary embodiment of the method, the primary job manager machine is configured to (i) instantiate or couple one or more additional secondary job manager machines in response to a detected increase in job load, or (ii) terminate or decouple one or more additional secondary job manager machines in response to a detected decrease in job load.

The invention additionally provides a system for implementing job execution within a network based remote computing environment. The system comprises a processor implemented secondary job manager machine configured to (i) receive from a primary job manager machine, a secondary job execution request identifying a job for execution within the remote computing environment, wherein receiving the secondary job execution request at the secondary job manager machine is preceded by the primary job manager machine (a) receiving a primary job execution request from a job execution requesting device, wherein the primary job execution request comprises a request for execution of the identified job within the remote computing environment, (b) selecting the secondary job manager machine from among a plurality of secondary job manager machines assigned to the primary job manager machine, and (c) transmitting the secondary job execution request to the secondary job manager machine, wherein the transmitted secondary job execution request is generated based on the primary job execution request, (ii) select from among a plurality of computing machines assigned to the secondary job manager machine, at least one computing machine for execution of one or more computing tasks corresponding to the job specified in the secondary job execution request, (iii) transmit to the selected at least one computing machine, one or more data messages comprising instruction(s) for implementing execution of the one or more computing tasks, (iv) receive at the secondary job manager machine, output data comprising execution output of the one or more computing tasks, wherein said output data is generated and transmitted by the at least one computing machine, and (v) transmit the received output data to a target recipient device (e.g. the job execution requesting device, or a specified intended recipient device).

In a system embodiment, the secondary job manager machine is configured such that transmission of the received output data from the secondary job manager machine to the job execution requesting device bypasses the primary job manager machine.

In another embodiment of the system, the secondary job manager machine is configured to respond to receiving the secondary job execution request from the primary job manager by (i) associating the job identified within the secondary job execution request with an accelerator cache proxy corresponding to the secondary job manager machine, and (ii) setting one or more access permissions within the accelerator cache proxy to permit the selected at least one computing machine to retrieve from accelerator cache proxy, data objects required for execution of the one or more computing tasks—wherein the one or more data messages transmitted to the selected at least one computing machine includes an accelerator cache proxy identifier corresponding to the accelerator cache proxy that has been associated with the job.

In a specific system embodiment, the secondary job manager machine is configured to select the accelerator cache proxy for association with the job identified within the secondary job execution request, from among a set of discrete accelerator cache proxies assigned to the secondary job manager machine.

In a more particular system embodiment, each accelerator cache proxy within the set of discrete accelerator cache proxies assigned to the secondary job manager machine (i) comprises an application environment instance that is generated within a memory coupled with the selected secondary job manager machine, and (ii) is configured to obtain from a data center or computing device that is external to the remote computing environment, data objects required for execution of a job for execution within the remote computing environment that has been associated with said accelerator cache proxy by the secondary job manager machine.

In a system embodiment, the secondary job manager machine is configured to instantiate a discrete instance of an accelerator cache proxy for each distinct job executing requesting device, job execution requesting user, or remote application instance, from which one or more secondary job execution requests that have been are transmitted to the secondary job manager machine for execution within the remote computing environment, have originated.

In another system embodiment, the accelerator cache proxy associated with the job identified within the secondary job execution request is configured to respond to receiving a request for an identified data object from a requesting computing machine by (i) retrieving the identified data object, and (ii) transmitting the retrieved data object to the requesting computing machine—wherein the requesting computing machine is a computing machine from among the selected at least one computing machine. The step of retrieving the identified data object may comprise (i) retrieving the requested data object from an on-premise device, or a job execution requesting device associated with the job identified within the secondary job execution request, and (ii) storing the retrieved data object in the memory allocated to the accelerator cache proxy that received the request for the identified data object.

The invention also provides a computer program product for implementing job execution within a network based remote computing environment. The computer program product comprises a non-transitory computer usable medium having a computer readable program code embodied therein, the computer readable program code comprising instructions for implementing, the steps of (i) receiving at a secondary job manager machine from a primary job manager machine, a secondary job execution request identifying a job for execution within the remote computing environment, wherein receiving the secondary job execution request at the secondary job manager machine is preceded by the primary job manager machine (a) receiving a primary job execution request from a job execution requesting device, wherein the primary job execution request comprises a request for execution of the identified job within the remote computing environment, (b) selecting the secondary job manager machine from among a plurality of secondary job manager machines assigned to the primary job manager machine, and (c) transmitting the secondary job execution request to the secondary job manager machine, wherein the transmitted secondary job execution request is generated based on the primary job execution request, (ii) selecting from among a plurality of computing machines assigned to the secondary job manager machine, at least one computing machine for execution of one or more computing tasks corresponding to the job specified in the secondary job execution request, (iii) transmitting to the selected at least one computing machine, one or more data messages comprising instruction(s) for implementing execution of the one or more computing tasks, (iv) receiving at the secondary job manager machine, output data comprising execution output of the one or more computing tasks, wherein said output data is generated and transmitted by the at least one computing machine, and (v) transmitting the received output data to a target recipient device (e.g. the job execution requesting device, or a specified intended recipient device).

Figure 15:
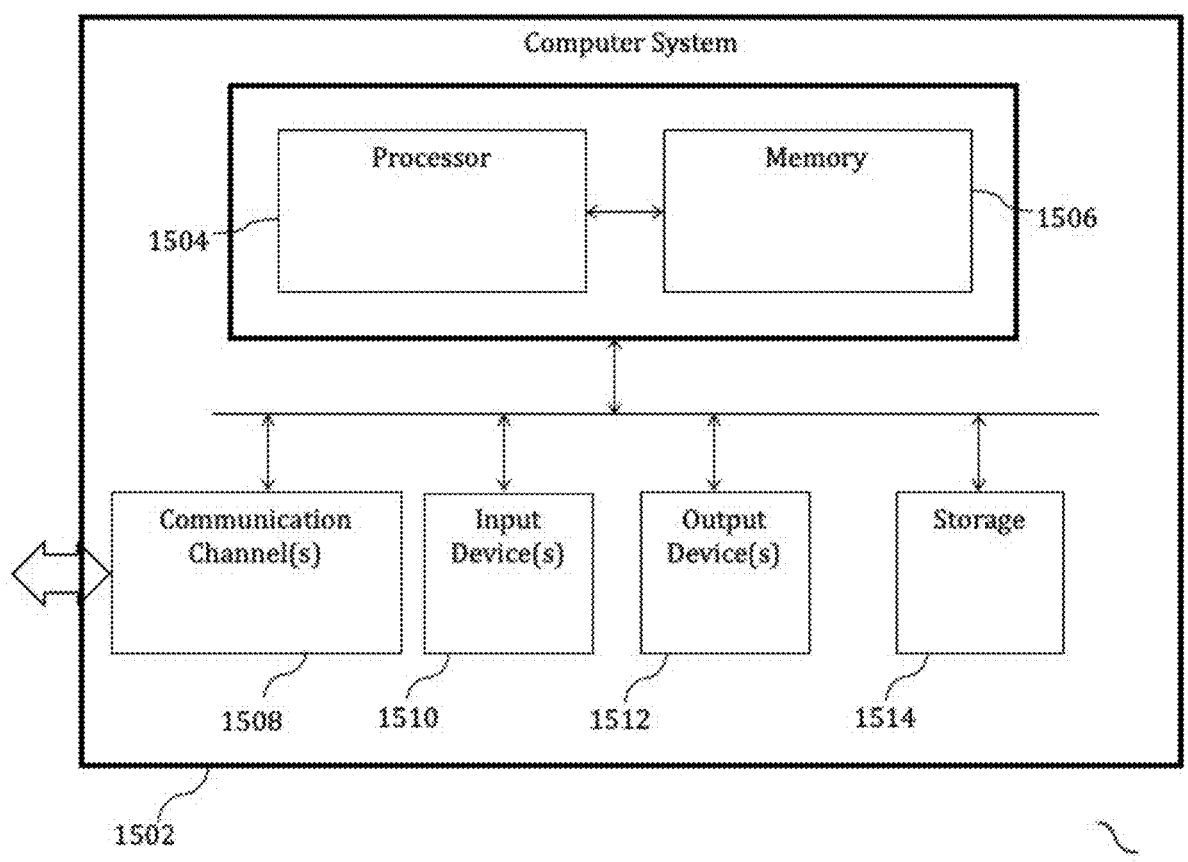
FIG. 15 illustrates an exemplary computer system of a type that may be used to implement the teachings of the present invention.

FIG. 15 illustrates an exemplary computer system according to which various embodiments of the present invention may be implemented.

System 1500 includes computer system 1502 which in turn comprises one or more processors 1504 and at least one memory 1506. Processor 1504 is configured to execute program instructions—and may be a real processor or a virtual processor. It will be understood that computer system 1502 does not suggest any limitation as to scope of use or functionality of described embodiments. The computer system 1502 may include, but is not limited to, one or more of a general-purpose computer, a programmed microprocessor, a micro-controller, an integrated circuit, and other devices or arrangements of devices that are capable of implementing the steps that constitute the method of the present invention. Exemplary embodiments of a computer system 1502 in accordance with the present invention may include one or more servers, desktops, laptops, tablets, smart phones, mobile phones, mobile communication devices, phablets and personal digital assistants. In an embodiment of the present invention, the memory 1506 may store software for implementing various embodiments of the present invention. The computer system 1502 may have additional components. For example, the computer system 1502 may include one or more communication channels 1508, one or more input devices 1510, one or more output devices 1512, and storage 1514. An interconnection mechanism (not shown) such as a bus, controller, or network, interconnects the components of the computer system 1502. In various embodiments of the present invention, operating system software (not shown) provides an operating environment for various softwares executing in the computer system 1502 using a processor 1504, and manages different functionalities of the components of the computer system 1502.

The communication channel(s) 1508 allow communication over a communication medium to various other computing entities. The communication medium provides information such as program instructions, or other data in a communication media. The communication media includes, but is not limited to, wired or wireless methodologies implemented with an electrical, optical, RF, infrared, acoustic, microwave, Bluetooth or other transmission media.

The input device(s) 1510 may include, but is not limited to, a touch screen, a keyboard, mouse, pen, joystick, trackball, a voice device, a scanning device, or any another device that is capable of providing input to the computer system 1502. In an embodiment of the present invention, the input device(s) 1510 may be a sound card or similar device that accepts audio input in analog or digital form. The output device(s) 1512 may include, but not be limited to, a user interface on CRT, LCD, LED display, or any other display associated with any of servers, desktops, laptops, tablets, smart phones, mobile phones, mobile communication devices, phablets and personal digital assistants, printer, speaker, CD/DVD writer, or any other device that provides output from the computer system 1502.

The storage 1514 may include, but not be limited to, magnetic disks, magnetic tapes, CD-ROMs, CD-RWs, DVDs, any types of computer memory, magnetic stripes, smart cards, printed barcodes or any other transitory or non-transitory medium which can be used to store information and can be accessed by the computer system 1502. In various embodiments of the present invention, the storage 1514 may contain program instructions for implementing any of the described embodiments.

In an embodiment of the present invention, the computer system 1502 is part of a distributed network or a part of a set of available cloud resources.

The present invention may be implemented in numerous ways including as a system, a method, or a computer program product such as a computer readable storage medium or a computer network wherein programming instructions are communicated from a remote location.

The present invention may suitably be embodied as a computer program product for use with the computer system 1502. The method described herein is typically implemented as a computer program product, comprising a set of program instructions that is executed by the computer system 1502 or any other similar device. The set of program instructions may be a series of computer readable codes stored on a tangible medium, such as a computer readable storage medium (storage 1514), for example, diskette, CD-ROM, ROM, flash drives or hard disk, or transmittable to the computer system 1502, via a modem or other interface device, over either a tangible medium, including but not limited to optical or analogue communications channel(s) 1508. The implementation of the invention as a computer program product may be in an intangible form using wireless techniques, including but not limited to microwave, infrared, Bluetooth or other transmission techniques. These instructions can be preloaded into a system or recorded on a storage medium such as a CD-ROM, or made available for downloading over a network such as the Internet or a mobile telephone network. The series of computer readable instructions may embody all or part of the functionality previously described herein.

Based on the above, it would be apparent that the present invention offers multiple and significant advantages, including (i) eliminating bottlenecks arising out of a static single job manager architecture and (ii) providing a readily scalable system that enables execution of jobs within a remote environment, and (iii) enabling machines within a remote environment that have been tasked with execution of one or more jobs, to access data or data objects required for execution of such job(s) in a manner that eliminates or reduces processing overheads and latency.

While the exemplary embodiments of the present invention are described and illustrated herein, it will be appreciated that they are merely illustrative. It will be understood by those skilled in the art that various modifications in form and detail may be made therein without departing from or offending the spirit and scope of the invention as defined by the appended claims. Additionally, the invention illustratively disclose herein suitably may be practiced in the absence of any element which is not specifically disclosed herein—and in a particular embodiment that is specifically contemplated, the invention is intended to be practiced in the absence of any one or more element which are not specifically disclosed herein.

The invention claimed is:

1. A method for implementing job execution within a network based remote computing environment, the method comprising:

receiving at a secondary job manager machine from a primary job manager machine, a secondary job execution request identifying a job for execution within the remote computing environment, wherein receiving the secondary job execution request at the secondary job manager machine is preceded by the primary job manager machine:
  receiving a primary job execution request from a job execution requesting device, wherein the primary job execution request comprises a request for execution of the identified job within the remote computing environment;
  selecting the secondary job manager machine from among a plurality of secondary job manager machines assigned to the primary job manager machine; and
  transmitting the secondary job execution request to the secondary job manager machine, wherein the transmitted secondary job execution request is generated based on the primary job execution request;

selecting from among a plurality of computing machines assigned to the secondary job manager machine, at least one computing machine for execution of one or more computing tasks corresponding to the job specified in the secondary job execution request;

transmitting to the selected at least one computing machine, one or more data messages comprising instruction(s) for implementing execution of the one or more computing tasks;

receiving at the secondary job manager machine, output data comprising execution output of the one or more computing tasks, wherein said output data is generated and transmitted by the at least one computing machine; and transmitting the received output data to a target recipient device;

wherein responsive to receiving the secondary job execution request from the primary job manager, the secondary job manager machine:
  associates the job identified within the secondary job execution request with an accelerator cache proxy corresponding to the secondary job manager machine; and
  sets one or more access permissions within the accelerator cache proxy to permit the selected at least one computing machine to retrieve from accelerator cache proxy, data objects required for execution of the one or more computing tasks;

and wherein the one or more data messages transmitted to the selected at least one computing machine includes an accelerator cache proxy identifier corresponding to the accelerator cache proxy that has been associated with the job.

2. The method as claimed in claim 1, wherein transmission of the received output data from the secondary job manager machine to the job execution requesting device bypasses the primary job manager machine.

3. The method as claimed in claim 1, wherein the secondary job manager machine selects the accelerator cache proxy for association with the job identified within the secondary job execution request, from among a set of discrete accelerator cache proxies assigned to the secondary job manager machine.

4. The method as claimed in claim 3, wherein each accelerator cache proxy within the set of discrete accelerator cache proxies assigned to the secondary job manager machine:
  comprises an application environment instance that is generated within a memory coupled with the secondary job manager machine; and
  is configured to obtain from a data center or computing device that is external to the remote computing environment, data objects required for execution of a job for execution within the remote computing environment that has been associated with said accelerator cache proxy by the secondary job manager machine.

5. The method as claimed in claim 4, wherein the secondary job manager machine is configured to instantiate a discrete instance of an accelerator cache proxy for each distinct job executing requesting device, job execution requesting user, or remote application instance, from which one or more secondary job execution requests that have been are transmitted to the secondary job manager machine for execution within the remote computing environment, have originated.

6. The method as claimed in claim 1, wherein the accelerator cache proxy associated with the job identified within the secondary job execution request is configured to respond to receiving a request for an identified data object from a requesting computing machine by:
  retrieving the identified data object; and
  transmitting the retrieved data object to the requesting computing machine;
  wherein the requesting computing machine is a computing machine from among the selected at least one computing machine.

7. The method as claimed in claim 6, wherein responsive to a determination that the identified data object is unavailable within a memory allocated to the accelerator cache proxy that received the request for the identified data object, the step of retrieving the identified data object comprises:
  retrieving the requested data object from an on-premise device, or a job execution requesting device associated with the job identified within the secondary job execution request; and
  storing the retrieved data object in the memory allocated to the accelerator cache proxy that received the request for the identified data object.

8. The method as claimed in claim 1 wherein the job execution requesting device is external to the remote computing environment.

9. The method as claim 1, wherein the plurality of secondary job manager machines are assigned to the primary job manager machine in a master-slave configuration, such that each of the plurality of secondary job manager machines are slaved to the primary job manager machine.

10. The method as claimed in claim 9, wherein the primary job manager machine is configured to:
instantiate or couple one or more additional secondary job manager machines in response to a detected increase in job load; or
terminate or decouple one or more additional secondary job manager machines in response to a detected decrease in job load.

11. A system for implementing job execution within a network based remote computing environment, the system comprising:
a processor implemented secondary job manager machine configured to:
receive from a primary job manager machine, a secondary job execution request identifying a job for execution within the remote computing environment, wherein receiving the secondary job execution request at the secondary job manager machine is preceded by the primary job manager machine:
receiving a primary job execution request from a job execution requesting device, wherein the primary job execution request comprises a request for execution of the identified job within the remote computing environment;
selecting the secondary job manager machine from among a plurality of secondary job manager machines assigned to the primary job manager machine; and
transmitting the secondary job execution request to the secondary job manager machine, wherein the transmitted secondary job execution request is generated based on the primary job execution request;
select from among a plurality of computing machines assigned to the secondary job manager machine, at least one computing machine for execution of one or more computing tasks corresponding to the job specified in the secondary job execution request;
transmit to the selected at least one computing machine, one or more data messages comprising instruction(s) for implementing execution of the one or more computing tasks;
receive at the secondary job manager machine, output data comprising execution output of the one or more computing tasks, wherein said output data is generated and transmitted by the at least one computing machine; and
transmit the received output data to a target recipient device;
wherein the secondary job manager machine is configured to respond to receiving the secondary job execution request from the primary job manager by:
associating the job identified within the secondary job execution request with an accelerator cache proxy corresponding to the secondary job manager machine; and
setting one or more access permissions within the accelerator cache proxy to permit the selected at least one computing machine to retrieve from accelerator cache proxy, data objects required for execution of the one or more computing tasks;
wherein the one or more data messages transmitted to the selected at least one computing machine includes an accelerator cache proxy identifier corresponding to the accelerator cache proxy that has been associated with the job.

12. The system as claimed in claim 11, wherein the secondary job manager machine is configured such that transmission of the received output data from the secondary job manager machine to the job execution requesting device bypasses the primary job manager machine.

13. The system as claimed in claim 11, wherein the secondary job manager machine is configured to select the accelerator cache proxy for association with the job identified within the secondary job execution request, from among a set of discrete accelerator cache proxies assigned to the secondary job manager machine.

14. The system as claimed in claim 13, wherein each accelerator cache proxy within the set of discrete accelerator cache proxies assigned to the secondary job manager machine:
comprises an application environment instance that is generated within a memory coupled with the selected secondary job manager machine; and
is configured to obtain from a data center or computing device that is external to the remote computing environment, data objects required for execution of a job for execution within the remote computing environment that has been associated with said accelerator cache proxy by the secondary job manager machine.

15. The system as claimed in claim 14, wherein the secondary job manager machine is configured to instantiate a discrete instance of an accelerator cache proxy for each distinct job executing requesting device, job execution requesting user, or remote application instance, from which one or more secondary job execution requests that have been are transmitted to the secondary job manager machine for execution within the remote computing environment, have originated.

16. The system as claimed in claim 11, wherein the accelerator cache proxy associated with the job identified within the secondary job execution request is configured to respond to receiving a request for an identified data object from a requesting computing machine by:
retrieving the identified data object; and
transmitting the retrieved data object to the requesting computing machine;
wherein the requesting computing machine is a computing machine from among the selected at least one computing machine;
and wherein the step of retrieving the identified data object comprises:
retrieving the requested data object from an on-premise device, or a job execution requesting device associated with the job identified within the secondary job execution request; and
storing the retrieved data object in the memory allocated to the accelerator cache proxy that received the request for the identified data object.

17. A computer program product for implementing job execution within a network based remote computing environment, comprising a non-transitory computer usable medium having a computer readable program code embodied therein, the computer readable program code comprising instructions for implementing, the steps of:
receiving at a secondary job manager machine from a primary job manager machine, a secondary job execution request identifying a job for execution within the remote computing environment, wherein:

receiving the secondary job execution request at the secondary job manager machine is preceded by the primary job manager machine:
  receiving a primary job execution request from a job execution requesting device, wherein the primary job execution request comprises a request for execution of the identified job within the remote computing environment;
  selecting the secondary job manager machine from among a plurality of secondary job manager machines assigned to the primary job manager machine; and
  transmitting the secondary job execution request to the secondary job manager machine, wherein the transmitted secondary job execution request is generated based on the primary job execution request;
selecting from among a plurality of computing machines assigned to the secondary job manager machine, at least one computing machine for execution of one or more computing tasks corresponding to the job specified in the secondary job execution request;
transmitting to the selected at least one computing machine, one or more data messages comprising instruction(s) for implementing execution of the one or more computing tasks;
receiving at the secondary job manager machine, output data comprising execution output of the one or more computing tasks, wherein said output data is generated and transmitted by the at least one computing machine; and
transmitting the received output data to a target recipient device;
wherein responsive to receiving the secondary job execution request from the primary job manager, the secondary job manager machine:
  associates the job identified within the secondary job execution request with an accelerator cache proxy corresponding to the secondary job manager machine; and
  sets one or more access permissions within the accelerator cache proxy to permit the selected at least one computing machine to retrieve from accelerator cache proxy, data objects required for execution of the one or more computing tasks;
and wherein the one or more data messages transmitted to the selected at least one computing machine includes an accelerator cache proxy identifier corresponding to the accelerator cache proxy that has been associated with the job.

* * * * *